US012049878B2

(12) United States Patent
Simmonds et al.

(10) Patent No.: US 12,049,878 B2
(45) Date of Patent: Jul. 30, 2024

(54) SEGMENTED WALL-LESS HALL THRUSTER

(71) Applicant: The Trustees of Princeton University, Princeton, NJ (US)

(72) Inventors: Jacob Simmonds, Princeton, NJ (US); Yevgeny Raitses, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 17/896,651

(22) Filed: Aug. 26, 2022

(65) Prior Publication Data

US 2023/0213024 A1 Jul. 6, 2023

Related U.S. Application Data

(60) Provisional application No. 63/237,196, filed on Aug. 26, 2021.

(51) Int. Cl.
*F03H 1/00* (2006.01)

(52) U.S. Cl.
CPC .................................. *F03H 1/0068* (2013.01)

(58) Field of Classification Search
CPC ..... F03H 1/0068; F03H 1/0075; F03H 1/0062
See application file for complete search history.

(56) References Cited

U.S. PATENT DOCUMENTS 9,897,079 B2 2/2018 Karadag
2006/0218891 A1* 10/2006 Roy ...................... F03H 1/0031
60/203.1
2017/0367168 A1* 12/2017 McDonald ........ H01J 37/32596
2020/0040877 A1* 2/2020 Mazouffre ............ F03H 1/0081
2020/0102100 A1* 4/2020 Lozano .................... B64G 1/64

OTHER PUBLICATIONS

Kieckhafer et al., “Effect of Segmented Anodes on the Beam Profile of a Hall thruster”. Paper AIAA 2004-4101 (Year: 2004).*
Constantinides “Magnet Selection” Arnold Magnetic Technologies, Magnets 2003, Oct. 15-17, 2003 (Year: 2003).*

(Continued)

*Primary Examiner* — Arun Goyal
*Assistant Examiner* — William L Breazeal
(74) *Attorney, Agent, or Firm* — MEAGHER EMANUEL LAKS GOLDBERG & LIAO, LLP

(57) ABSTRACT

Disclosed is a miniaturized plasma propulsion device with minimized surface area of the thruster walls exposed to the plasma and, as a result, reduced plasma-surface interactions including a set of segmented electrodes to facilitate the following improvements compared to relevant existing technologies: 1) control of the plasma flow including focusing of the plasma plume 2) increase of the thrust 2) reduction of inefficiencies associated with the electron cross field current, and 3) mitigation of low frequency oscillations. The electrodes affect all these actions when a DC or modulated voltage is applied to one or all of them with the same or different amplitudes, with the same or different frequencies or phases which are all optimized to realize the best performance through changes in the acceleration and/or ionization regions. In addition, the applied voltage to the main electrodes may also be modulated.

21 Claims, 12 Drawing Sheets

(56) References Cited

OTHER PUBLICATIONS

Warner "Theoretical and Experimental Investigation of Hall Thruster Miniaturization" PhD dissertation, Aeronautics and Astronautics, MIT, Jun. 2007 (Year: 2007).*
Romadanov "Control of Coherent Structures via External Drive of the Breathing Mode" (Year: 2019).*
Shi "Controlling azimuthal spoke modes in a cylindrical Hall thruster using a segmented anode" (Year: 2018).*
Matyash "Rotating spoke instabilities in a wall-less Hall Thruster Simulations" (Year: 2019).*
Karadag, Burak, "External Discharge Plasma Thruster," Ph.D. thesis, Department of Space and Astronautical Science, School of Physical Sciences, Sokendai (The Graduate University for Advanced Studies), 2018.
Karban, Pavel et al., "Numerical solution of coupled problems using code Agros2D," Computing, vol. 95 (Suppl. 1), pp. S381-S408, Jan. 2013.
Mazouffre, S. et al., "Development and characterization of a wall-less Hall thruster," 50th AIAA/ASME/SAE/ASEE Joint Propulsion Conference, AIAA Propulsion and Energy Forum, Cleveland, OH, Jul. 28-30, 2014.
Romadanov, I. et al., "Control of Coherent Structures via External Drive of the Breathing Mode," Plasma Physics Reports, vol. 45, No. 2, pp. 134-146, 2019.
Karadag, Burak, "Thrust performance, propellant ionization, and thruster erosion of an external discharge plasma thruster," Journal of Applied Physics, vol. 123, No. 153302, Apr. 20, 2018.
Karadag, Burak et al., "External Discharge Plasma Thruster," Journal of Propulsion and Power, vol. 34, No. 4, Jul. 2018.
Kapulkin, A.M. et al., "Outside Electric Field Thruster," Space Technology, vol. 15, No. 6, pp. 391-394, Oct. 1995.
Karadag, Burak et al., "Thrust performance, propellant ionization, and thruster erosion of an external discharge plasma thruster," Journal of Applied Physics, vol. 123, No. 153302, Apr. 20, 2018.
Vaudolon, Julien et al., "Optimization of a wall-less Hall thruster," Applied Physics Letters, vol. 107, No. 174103, Oct. 27, 2015.
Ahedo, E. and Merino, M., "Two-dimensional supersonic plasma acceleration in a magnetic nozzle," Physics of Plasmas, vol. 17, No. 073501, Jul. 6, 2010.
Andreussi, T. et al., "Influence of the magnetic field configuration on the plasma flow in Hall thrusters," Plasma Physics and Controlled Fusion, vol. 60, No. 014015, Oct. 27, 2017.
Barral, S. and Ahedo, E., "On the Origin of Low Frequency Oscillations in Hall Thrusters," AIP Conference Proceedings, vol. 993, pp. 439-442, Mar. 19, 2008.
Biloiu, Ioana A. et al., "Ion beam acceleration in a divergent magnetic field," Applied Physics Letters, vol. 92, No. 191502, May 13, 2008.
Boeuf, Jean-Pierre, "Tutorial: Physics and modeling of Hall thrusters," Journal of Applied Physics, vol. 121, No. 011101, Jan. 3, 2017.
Smirnov, A. et al., "Parametric investigation of miniaturized cylindrical and annular Hall thrusters," Journal of Applied Physics, vol. 92, No. 10, pp. 5673-5679, Nov. 15, 2002.
Smirnov, A. et al., "Electron Transport and Ion Acceleration in a Low-Power Cylindrical Hall Thruster," 40th AIAA/ASME/SAE/ASEE Joint Propulsion Conference and Exhibit, Fort Lauderdale, Florida, Jul. 11-14, 2004.
Raitses, Y. and Fisch, N. J., "Parametric investigations of a nonconventional Hall thruster," Physics of Plasmas, vol. 8, No. 5, pp. 2579-2586, May 2001.
Smirnov, A. et al., "Electron cross-field transport in a low power cylindrical Hall thruster," Physics of Plasmas, vol. 11, No. 11, pp. 4922-4933, Nov. 2004.
Comfort, R.H., "The Magnetic Mirror Force in Plasma Fluid Models," Geophysical Monograph Series, Modeling Magnetospheric Plasma, American Geophysical Union, vol. 44, pp. 51-53, 1988.
Conversano, Ryan W. et al., "Performance Analysis of a Low-Power Magnetically Shielded Hall Thruster: Experiments," Journal of Propulsion and Power, vol. 33, No. 4, pp. 975-983, Jul.-Aug. 2017.
Dorf, L. et al., "Experimental studies of anode sheath phenomena in a Hall thruster discharge," Journal of Applied Physics, vol. 97, No. 103309, May 16, 2005.
Dunaevsky, A. et al., "Ferroelectric cathodes in transverse magnetic fields," Journal of Applied Physics, vol. 93, No. 6, pp. 3481-3485, Mar. 15, 2003.
Ekholm, Jared M. et al., "Plume Characteristics of the Busek 600 W Hall Thruster," 42nd AIAA/ASME/SAE/ASEE Joint Propulsion Conference & Exhibit, Sacramento, California, Jul. 9-12, 2006.
Ellison, C. L. et al., "Cross-field electron transport induced by a rotating spoke in a cylindrical Hall thruster," Physics of Plasmas, vol. 19, No. 013503, Jan. 12, 2012.
Raitses, Y. et al., "Enhanced performance of cylindrical Hall thrusters," Applied Physics Letters, vol. 90, No. 221502, May 30, 2007.
Fisch, N.J. et al., "Ion acceleration in supersonically rotating magnetized-electron plasma," Plasma Physics and Controlled Fusion, vol. 53, No. 124038, Nov. 14, 2011.
Gao, Yuanyuan et al., "Effect of anode position on the performance characteristics of a low-power cylindrical Hall thruster," Physics of Plasmas, vol. 24, No. 063518, Jun. 16, 2017.
Goncharov, A. A. et al., "Novel modification of Hall-type ion source (study and the first results)," Review of Scientific Instruments, vol. 87, No. 02A501, Sep. 29, 2015.
Grimaud, Lou et al., "Design and characterization of a 200W Hall thruster in 'magnetic shielding' configuration," 52nd AIAA/SAE/ASEE Joint Propulsion Conference, AIAA Propulsion and Energy Forum, Salt Lake City, UT, Jul. 25-27, 2016.
Grimaud, L. and Mazouffre, S., "Ion behavior in low-power magnetically shielded and unshielded Hall thrusters," Plasma Sources Science and Technology, vol. 26, No. 055020, Apr. 7, 2017.
Griswold, Martin E. et al., "Cross-field plasma lens for focusing of the Hall thruster plume," Plasma Sources Science and Technology, vol. 23, No. 044005, Jul. 22, 2014.
Hofer, Richard R. et al., "High-Specific Impulse Hall Thrusters, Part 1: Influence of Current Density and Magnetic Field," Journal of Propulsion and Power, vol. 22, No. 4, pp. 721-731, Jul.-Aug. 2006.
Hu, Yanlin et al., "Study on the influence of magnetic mirror ratio on the erosion of the bottom channel of cylindrical Hall thruster with magnetically insulated anode," Japanese Journal of Applied Physics, vol. 59, No. 046002, Mar. 30, 2020.
Diamant, Kevin D. et al., "Ionization, Plume Properties, and Performance of Cylindrical Hall Thrusters," IEEE Transactions on Plasma Science, vol. 38, No. 4, pp. 1052-1057, Apr. 2010.
Smirnov, Artem N. et al., "Electron Cross-Field Transport in a Miniaturized Cylindrical Hall Thruster," IEEE Transactions on Plasma Science, vol. 34, No. 2, pp. 132-141, Apr. 2006.
Simmonds, J. and Raitses, Y., "Miniaturized Cylindrical Hall Thrusters: Magneto-Electrostatic Trap Thruster," Proceedings of the 36th International Electric Propulsion Conference, University of Vienna, Vienna, Austria, Sep. 15-20, 2019.
Raitses, Y. et al., "Operation of a segmented Hall thruster with low-sputtering carbon-velvet electrodes," Journal of Applied Physics, vol. 99, No. 036103, Feb. 8, 2006.
Jiang, Yiwei et al., "Magnetic mirror effect in a cylindrical Hall thruster," Journal of Physics D: Applied Physics, vol. 51, No. 035201, Dec. 29, 2017.
Karadag, Burak et al., "External Discharge Plasma Thruster," Journal of Propulsion and Power, vol. 34, No. 4, pp. 1093-1096, Jul.-Aug. 2018.
Kaufman, Harold R. et al., "End-Hall ion source," Journal of Vacuum Science and Technology, vol. A 5, No. 4, pp. 2081-2084, Jul. 1, 1987.
Kaufman, Harold R. et al., "End-Hall Thrusters," AIAA/DGLR/JSASS 21st International Electric Propulsion Conference, Orlando, Florida, Jul. 18-20, 1990.
Keidar, Michael et al., "On the potential distribution in Hall thrusters," Applied Physics Letters, vol. 85, pp. 2481-2483, Sep. 28, 2004.
Khayms, V. and Martinez-Sanchez, M., "Design of a miniaturized Hall thruster for microsatellites," AIAA, ASME, SAE, and ASEE, 32nd Joint Propulsion Conference and Exhibit, Lake Buena Vista, Florida, Jul. 1-3, 1996.

(56) References Cited

OTHER PUBLICATIONS

Sydorenko, D. et al., "Kinetic simulation of secondary electron emission effects in Hall thrusters," Physics of Plasmas, vol. 13, No. 014501, Jan. 12, 2006.
Kraus, B.F. and Raitses, Y., "Floating potential of emitting surfaces in plasmas with respect to the space potential," Physics of Plasmas, vol. 25, No. 030701, Mar. 19, 2018.
Levchenko, Igor et al., "Space micropropulsion systems for Cubesats and small satellites: From proximate targets to furthermost frontiers," Applied Physics Reviews, vol. 5, No. 011104, Feb. 22, 2018.
Lobbia, Robert B. and Gallimore, Alec D., "Two-dimensional Time-resolved Breathing Mode Plasma Fluctuation Variation with Hall Thruster Discharge Settings," 31st International Electric Propulsion Conference, University of Michigan , Ann Arbor, Michigan, Sep. 20-24, 2009.
Mao, Wei et al., "Study on the erosion phenomenon at the bottom channel of magnetically insulated anode cylindrical Hall thruster," Vacuum, vol. 162, pp. 145-149, 2019.
Matyash, K. et al., "Rotating spoke instabilities in a wall-less Hall thruster: simulations," Plasma Sources Science and Technology, vol. 28, No. 044002, Apr. 24, 2019.
Mazouffre, S. et al., "Rotating spoke instabilities in a wall-less Hall thruster: experiments," Plasma Sources Science and Technology, vol. 28, No. 054002, May 22, 2019.
Mazouffre, S. et al., "Development and experimental characterization of a wall-less Hall thruster," Journal of Applied Physics, vol. 116, No. 243302, Dec. 23, 2014.
McVey, John B. et al., "Characteristics of the T-220HT Hall-Effect Thruster," 39th AIAA/ASME/SAE/ASEE Joint Propulsion Conference and Exhibit, Huntsville, Alabama, Jul. 20-23, 2003.
Mikellides, Ioannis G. et al., "Design of a Laboratory Hall Thruster with Magnetically Shielded Channel Walls, Phase III: Comparison of Theory with Experiment," 48th AIAA/ASME/SAE/ASEE Joint Propulsion Conference & Exhibit, Atlanta, Georgia, Jul. 30-Aug. 1, 2012.
Mikellides, Ioannis G. et al., "Magnetic shielding of walls from the unmagnetized ion beam in a Hall thruster," Applied Physics Letters, vol. 102, No. 023509, Jan. 17, 2013.
Raitses, Y. et al., "Plume reduction in segmented electrode Hall thruster," Journal of Applied Physics, vol. 88, No. 3, pp. 1263-1270, Aug. 1, 2000.
Spektor, R. et al., "Laser induced fluorescence measurements of the cylindrical Hall thruster plume," Physics of Plasmas, vol. 17, No. 093502, Sep. 17, 2010.
Raitses, Y. et al., "Effects of enhanced cathode electron emission on Hall thruster operation," Physics of Plasmas, vol. 16, No. 057106, May 13, 2009.
Raitses, Y. et al., "Preliminary Results of Plasma Flow Measurements in a 2 kW Segmented Hall Thruster," Princeton Plasma Physics Lab, p. PPPL-3796, 2003.
Raitses, Y. et al., "Space charge saturated sheath regime and electron temperature saturation in Hall thrusters," Physics of Plasmas, vol. 12, No. 073507, Jul. 7, 2005.
Rapp, Donald and Englander-Golden, Paula, "Total Cross Sections for Ionization and Attachment in Gases by Electron Impact. I. Positive Ionization," The Journal of Chemical Physics, vol. 43, pp. 1464-1479, May 18, 2004.
Sheehan, J.P. et al., "Recommended Practice for Use of Emissive Probes in Electric Propulsion Testing," Journal of Propulsion and Power, vol. 33, No. 3, pp. 614-637, May-Jun. 2017.
Shirasaki, Atsushi and Tahara, Hirokazu, "Operational characteristics and plasma measurements in cylindrical Hall thrusters," Journal of Applied Physics, vol. 101, No. 073307, Apr. 9, 2007.
Smirnov, A. et al., "Plasma measurements in a 100 W cylindrical Hall thruster," Journal of Applied Physics, vol. 95, No. 5, pp. 2283-2292, Mar. 1, 2004.
Staack, D. et al., "Temperature gradient in Hall thrusters," Applied Physics Letters, vol. 84, No. 16, pp. 3028-3030, Apr. 19, 2004.
Staack, D. et al., "Shielded electrostatic probe for nonperturbing plasma measurements in Hall thrusters," Review of Scientific Instruments, vol. 75, No. 2, pp. 393-399, Feb. 2004.
Fisch, N.J. et al., "Variable operation of Hall thruster with multiple segmented electrodes," Journal of Applied Physics, vol. 89, No. 4, pp. 2040-2046, Feb. 15, 2001.
Lobbia, Robert B. et al., "Pole Erosion Measurements for the Development Model of the Magnetically Shielded Miniature Hall Thruster (MaSMi-DM)," 36th International Electric Propulsion Conference, University of Vienna, Vienna, Austria, Sep. 15-20, 2019.
Kaganovich, I. D. et al., "Kinetic effects in a Hall thruster discharge," Physics of Plasmas, vol. 14, No. 057104, May 1, 2007.
Smirnov, A. et al., "Enhanced Ionization in the Cylindrical Hall Thruster," Proceedings of the 28th International Electric Propulsion Conference, Toulouse, France, Paper 2003-156, Mar. 17-21, 2003.
Hamo, Omri et al., "Experimental investigation of an external discharge very low anode power (< 20 W) hall thruster," Journal of Electric Propulsion, vol. 1, No. 16, 2022.
Prysniakov, V.F. et al., "The Review of the Works on Electrical Propulsion Thrusters Development and Investigation, Carried Out at the Dnepropetrovsk State University," 24th International Electric Propulsion Conference, Moscow, Russia, Paper 1995-012, pp. 102-114, Sep. 19-23, 1995.
Arhipov, B.A. et al., "The Results of 7000-Hour SPT-100 Life Testing," Proceedings of the International Electric Propulsion Conference, Moscow, Russia, Paper 95-39, pp. 315-321, Sep. 19-23, 1995.
Maslennikov, N.A., "Lifetime of the Stationary Plasma Thruster," Proceedings of the International Electric Propulsion Conference, Moscow, Russia, Paper 95-75, pp. 505-514, Sep. 19-23, 1995.
Raitses, Yevgeny et al., "Cylindrical Hall thrusters with permanent magnets," Journal of Applied Physics, vol. 108, No. 093307, Nov. 2010.

* cited by examiner

SEGMENTED WALL-LESS HALL THRUSTER

CROSS-REFERENCE TO RELATED APPLICATIONS

The present invention claims priority to U.S. Provisional Patent Application 63/237,196, filed Aug. 26, 2021, the entirety of which is incorporated by reference herein.

STATEMENT REGARDING FEDERALLY SPONSORED RESEARCH OR DEVELOPMENT

This invention was made with government support under Grant #DE-AC02-09-CH11466 awarded by the Department of Energy. The government has certain rights in the invention.

TECHNICAL FIELD

The present disclosure is drawn to engines for space-going vehicles, and hall thrusters in particular.

BACKGROUND

Commercial satellites increasingly require propulsion devices to function. This is particularly notable with large constellation missions such as Starlink and OneWeb, which involve hundreds of satellites at a time requiring propulsion to maintain their formation. Conventional propulsion devices, however, have very limited satellite lifetimes, and require significant mass to provide necessary propulsion.

BRIEF SUMMARY

A miniaturized, high-lifetime, efficient low power plasma thruster as disclosed herein would increase satellite lifetime and mass available for payloads compared to conventional propulsion devices.

A segmented wall-less Hall thruster may be provided, including an insulator, a plurality of annular electrodes, and a magnetic core. The insulator may include a first (outer) surface and a second surface opposite the first surface. The magnetic core is coupled to the second surface. The plurality of electrodes includes an anode electrode coupled to the first outer surface, and at least one additional electrode coupled to the first outer surface and concentrically located with the anode electrode. The at least one additional electrode includes an inner electrode positioned within the anode electrode and/or an outer electrode positioned around the anode electrode.

The plurality of electrodes may include at least one segmented electrode. The magnetic core may include low carbon steel. The magnetic core may include a permanent magnet, which may be, e.g., composed of samarium cobalt and/or neodymium. The permanent magnet may be in contact with the second surface of the insulator. The permanent magnet may be separated from the second surface of the insulator. The magnetic core may include an electromagnetic coil.

The anode electrode may include a high temperature non-magnetic material, such as stainless steel, molybdenum, and/or tungsten. Each additional electrode may, independently, include a high temperature non-magnetic material, such as stainless steel, molybdenum, and/or tungsten.

The insulator may be a ceramic, such as a boron nitride ceramic.

A system may be provided. The system may include a segmented wall-less Hall thruster as disclosed herein, and a cathode positioned to allow electrons to travel from the cathode to the anode of the segmented wall-less Hall thruster. In some embodiments, the cathode may be a thermionic hollow cathode or a thermionic filament. In some embodiments, the system may include a power supply configured to apply voltage to the cathode, and at least one of the plurality of electrodes. In some embodiments, the power supply may be configured to apply a DC or modulated voltage to an inner electrode and/or an outer electrode to change an acceleration region and/or an ionization region of the segmented wall-less Hall thruster. In some embodiments, the system may include at least one processor coupled to the power supply, the at least one processor configured to control an acceleration of the segmented wall-less Hall thruster by controlling the frequency and/or amplitude of a voltage provided by the power supply to at least one electrode of the plurality of electrodes and/or the cathode.

BRIEF DESCRIPTION OF DRAWINGS

Features of the present disclosure can be better understood with reference to the drawings, as described below. The drawings are not necessarily to scale; emphasis instead generally being placed upon illustrating the principles of the disclosure.

DETAILED DESCRIPTION

To improve upon conventional propulsion systems, a segmented wall-less Hall thruster may be provided.

Much like conventional Hall thrusters, the disclosed device generates thrust by accelerating ions in the applied electric and magnetic field. Differentiating the disclosed device from conventional Hall thrusters, inter alia, are the removal of the channel walls and the addition of an inner and/or outer periphery electrode. This makes the design of the disclosed thruster exceptionally simple and inexpensive.

Existing wall-less configurations have shown relatively low efficiency due to plasma escaping and a large divergence of accelerated ions.

In some embodiments, the disclosed device may advantageously include a segmented electrode (or set of segmented electrodes) in addition to the main discharge electrodes (anode and cathode) of the thruster. With a single additional electrode, recent experiments have shown that the thruster operates with higher performance. This electrode focuses the ions and increases thrust. In addition, the power consumption in this configuration is lower than the typical wall-less configuration, which further increases efficiency.

A general advantage of the wall less thruster design disclosed herein is the better use of the entire volume of the thruster for the generation of thrust than it is done in annular Hall thrusters. The plasma is confined within the thruster bounds through a magneto-electrostatic trap with high electric field both above the anode and in the center. This is unlike typical Hall thrusters which generate thrust and plasma in a narrow annular channel.

Additionally, operating both an inner and outer electrode appears to provide a 2-stage (distinct ionization and acceleration region) capability, which would allow further control by modulating the outer or inner electrodes to accelerate ions to higher energies.

The disclosed thrusters generally include electrodes positioned on and separated by an insulator, and a magnetic core.

Figure 1:
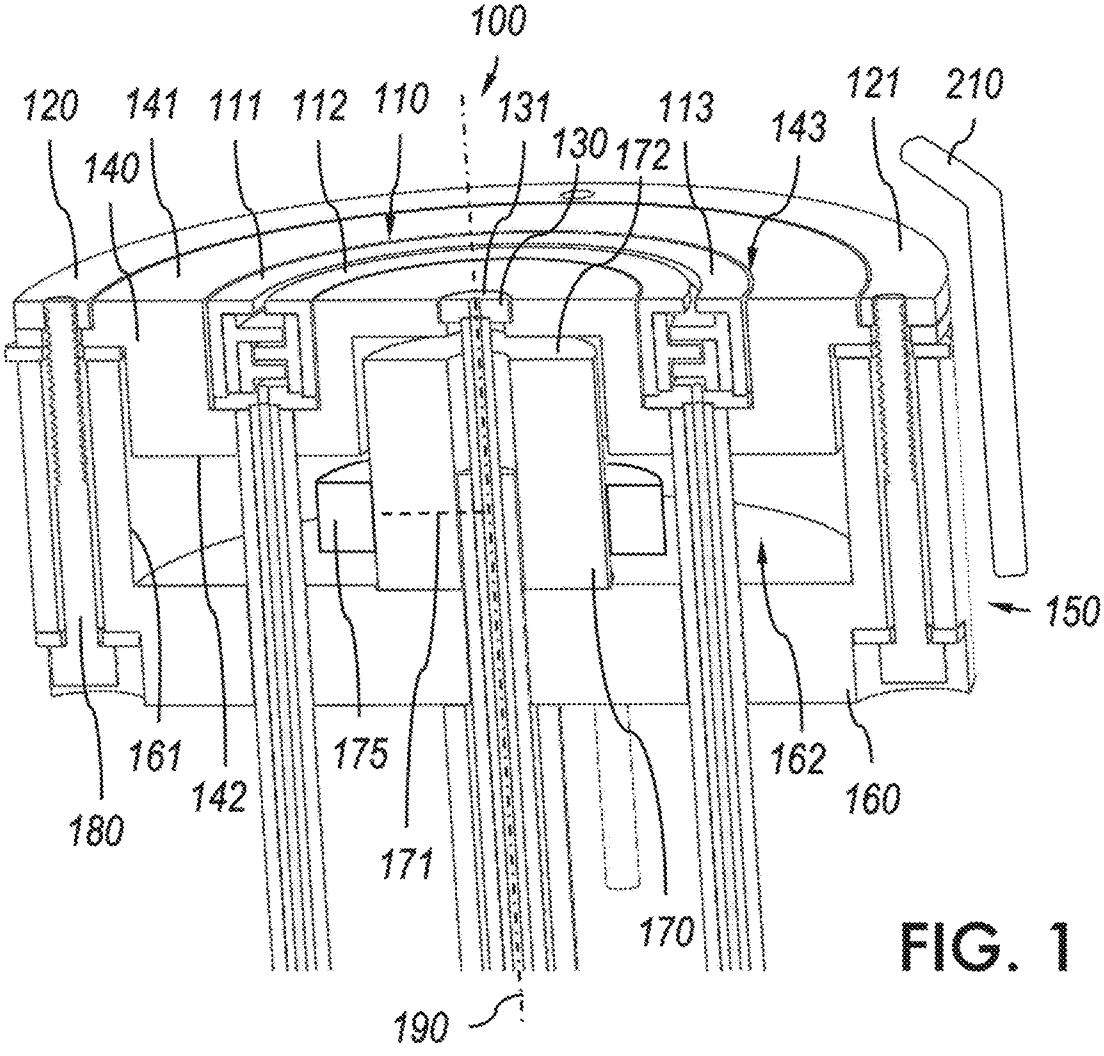
FIG. 1 is an illustration of a cross-cut section of an embodiment of a thruster.

Referring to FIG. 1, a segmented wall-less Hall thruster 100 may be seen.

The thruster may include an insulator 140 having a first surface 141 (e.g., an outward-facing surface) and a second surface 142 opposite the first outer surfaces. The insulator may have one or more recesses 143 defined on the first surface and/or the second surface. Such recesses may be used to surround other components of the thruster (such as magnets, electrodes, etc.) at least partially.

The insulator may preferably be a rigid material. The insulator may be, e.g., a ceramic material. such as a boron nitride (BN) ceramic material.

Figure 3:
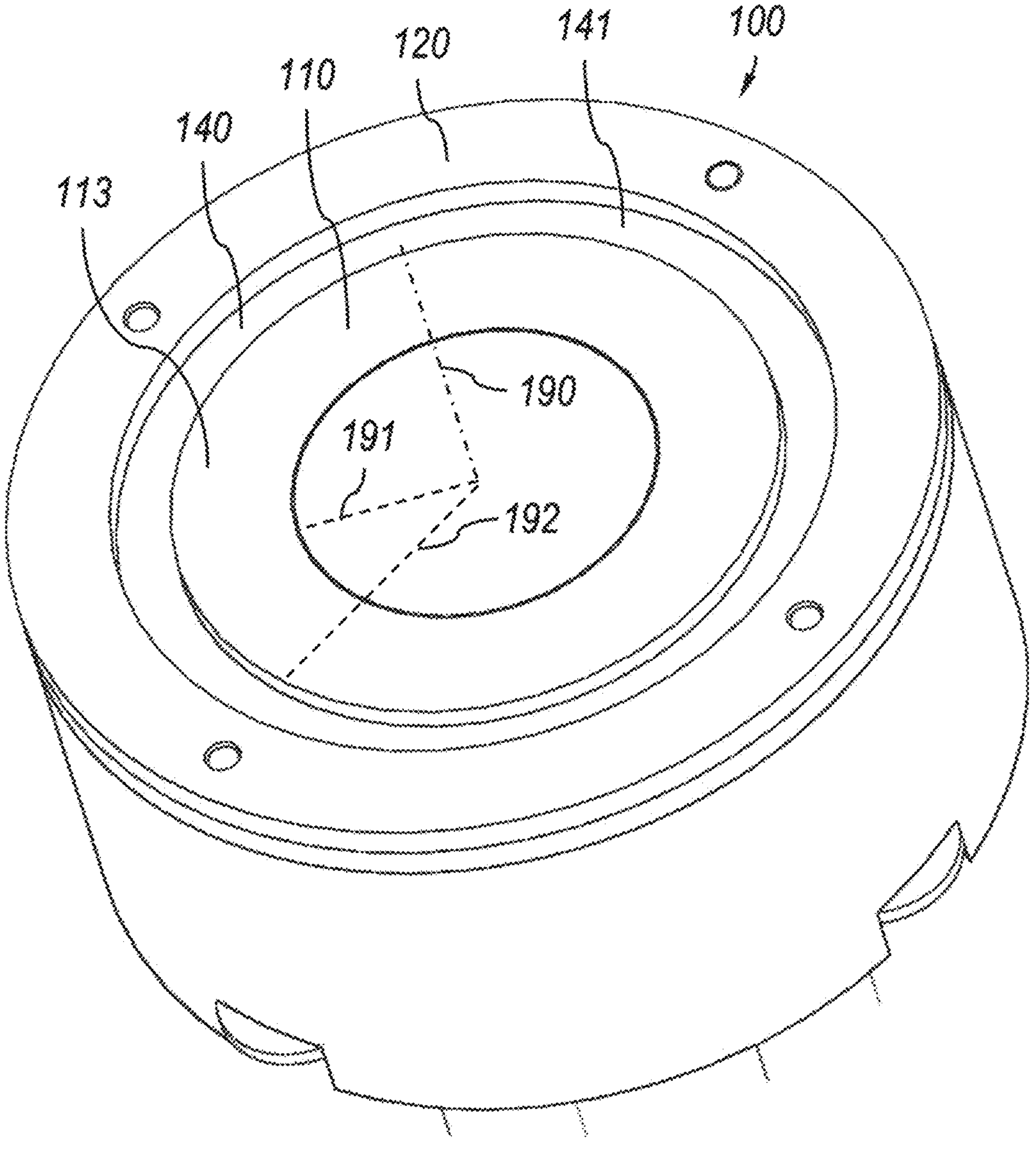
FIG. 3 is an illustration of a thruster with an anode and an outer electrode.

The thruster may include a plurality of electrodes. Each electrode is generally annular in shape around a central axis 190. As seen in FIG. 3, each electrode has an inner radius 191 and an outer radius 192, from the central axis (in FIG. 3, only the inner radius and outer radius of an anode electrode 110 are shown).

The plurality of electrodes may include an anode electrode 110 coupled to the first outer surface. The anode electrode may have a planar surface 113 facing outward in an axial direction (e.g., away from first surface 141 of the insulator).

The anode electrode may be a segmented electrode.

In some embodiments of a segmented electrode, the electrode may be divided into multiple segments. In FIG. 1, the anode 110 is divided in two segments, one of which is on the high potential side (e.g., "positive" side), such as first segment 111, while the other is on the low potential side (e.g., "negative" side), such as second segment 112. In some embodiments, the segments may be configured to be concentric around the central axis.

In some embodiments, the anode electrode may comprise a high temperature non-magnetic material, such as a stainless steel, molybdenum, and/or tungsten.

In some embodiments, the anode electrode may have an outer radius of less than 5 cm. In some embodiments, the anode electrode may have an outer radius of 2-5 cm. In some embodiments, the anode electrode may have an outer radius of 2-4 cm. In some embodiments, the anode electrode may have an outer radius of 2.5-3.5 cm.

The plurality of electrodes may include at least one additional electrode having an annular shape coupled to the first outer surface and concentrically located with the anode electrode. The additional electrode may include at least one inner electrode 130 and/or at least one outer electrode 120. In some embodiments, each additional electrode may, independently, comprise a high temperature non-magnetic material, such as a stainless steel, molybdenum, and/or tungsten.

As used herein, the term "inner electrode" refers to electrodes which have an outer radius smaller than an inner radius of the anode electrode. That is, each inner electrode may be considered as being positioned within the anode electrode. In some embodiments, there is a single inner electrode. In some embodiments, there are a plurality of inner electrodes.

Each inner electrode may have a planar surface 131 facing outward in an axial direction (e.g., away from first surface 141 of the insulator). In some embodiments, the planar surface 131 of each inner electrode is coplanar with the planar surface 113 of the anode electrode.

In some embodiments, each inner electrode may comprise a high temperature non-magnetic material, such as a stainless steel, molybdenum, and/or tungsten.

In some embodiments, each inner electrode may have an outer radius of less than 3 cm. In some embodiments, the anode electrode may have an outer radius of 0.1-3 cm. In some embodiments, the anode electrode may have an outer radius of 0.5-2.5 cm. In some embodiments, the anode electrode may have an outer radius of 1-2 cm.

As used herein, the term "outer electrode" refers to electrodes which have an inner radius larger than an outer radius of the anode electrode. That is, each outer electrode may be considered as being positioned around the anode electrode. In some embodiments, there is a single outer electrode. In some embodiments, there are a plurality of outer electrodes.

In some embodiments, each outer electrode may comprise a high temperature non-magnetic material, such as a stainless steel, molybdenum, and/or tungsten.

In some embodiments, each outer electrode may have an inner radius of greater than 5 cm. In some embodiments, the outer electrode may have an inner radius of 5-10 cm. In some embodiments, the outer electrode may have an inner radius of 5-9 cm. In some embodiments, the outer electrode may have an inner radius of 6-8 cm.

Each outer electrode may have a planar surface 121 facing outward in an axial direction (e.g., away from first surface 141 of the insulator). In some embodiments, the planar surface 121 of each outer electrode is coplanar with the planar surface 113 of the anode electrode.

As seen in FIG. 3, in some embodiments, the thruster may include, e.g., an anode electrode 110 and one additional electrode (shown here as outer electrode 120), separated by the insulator 140. In some embodiments, the planar surface 113 of the anode electrode may not be coplanar with the first surface 141 of the insulator. Referring to FIG. 1, in some embodiments, the planar surface 113 of the anode electrode may be coplanar with the first surface 141 of the insulator.

Figure 4:
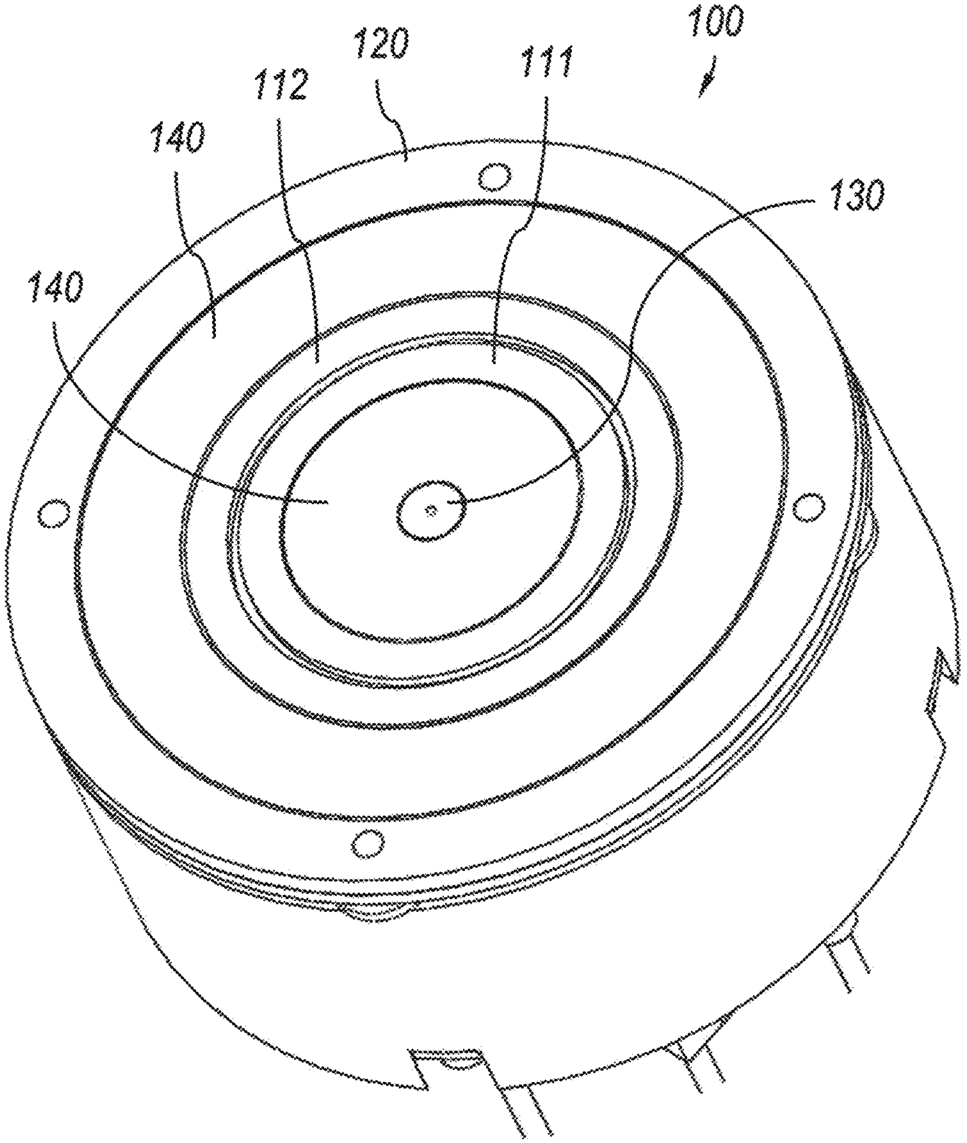
FIG. 4 is an illustration of a thruster with an anode, an outer electrode, and a central electrode.

As seen in FIG. 4, in some embodiments, the thruster may include, e.g., an anode electrode with a segmented electrode (e.g., segments 111, 112) and two additional electrodes (shown here as outer electrode 120 and inner electrode 130, each separated by the insulator 140.

The thruster may include a magnetic core 150 coupled to the second surface of the insulator. This may be done in any appropriate manner, including, e.g., coupling the magnetic to the insulator using bolts 180.

The magnetic core may include walls 160 having an inner surface 161 defining an internal volume of space 162. The inner volume of space is a substantially enclosed volume of space when coupled to the second surface of the insulator. In some embodiments, the magnetic core is generally annular in shape, with a bottom, forming a magnetic core that has a substantially u-shaped cross-section rotated around the central axis.

The walls may define a magnetic circuit. In some embodiments, the walls are a magnetic material. In some embodiments, the walls are a ferromagnetic material, such as iron, low carbon steel, etc.

The magnetic core may include a permanent magnet 170. The permanent magnet may have an annular structure and may be positioned around the central axis. In some embodiments, the outer radius 171 of the permanent magnet is less than the inner radius of the anode electrode.

In some embodiments, the permanent magnet may be within the inner volume of space defined by the walls. In some embodiments, the permanent magnet may be at least partially within the inner volume of space defined by the walls. In some embodiments, the permanent magnet may be positioned at least partially within a recess on the second surface of the insulator. In some embodiments, the permanent magnet may be within the enclosed volume of space define by the inner surface of the walls and the second surface of the insulator.

In some embodiments, the permanent magnet may have a surface 172 facing the second surface of the insulator. In some embodiments, the surface 172 may be in contact with the second surface. In some embodiments, the surface 172 may be separated by a gap from the second surface.

The permanent magnet may include any appropriate material. For example, in some embodiments, the permanent magnet may include samarium cobalt and/or neodymium.

In some embodiments, the magnetic core may include one or more electromagnetic coils 175. In some embodiments, the electromagnetic coils may be utilized instead of, or in addition to, the permanent magnet.

In some embodiments, the electromagnetic coils may be within the inner volume of space defined by the walls. In some embodiments, the electromagnetic coils may be at least partially within the inner volume of space defined by the walls. some embodiments, the electromagnetic coils may be within the enclosed volume of space define by the inner surface of the walls and the second surface of the insulator.

Figure 2:
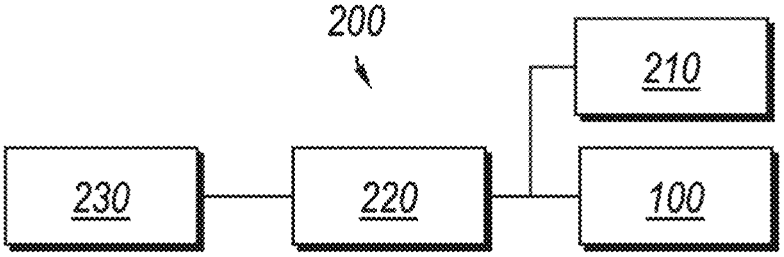
FIG. 2 is a block diagram of an embodiment of a system.

Referring to FIGS. 1 and 2, in some embodiments, a system may be provided. In some embodiments, the system 200 may include a segmented wall-less Hall thruster 100 as disclosed herein, as well as a cathode 210 positioned to allow electrons to travel from the cathode to the anode of the thruster. The cathode may be positioned at or near the edge of a plasma (not shown) generated during operation of the thruster (e.g., a tip of the cathode may be positioned at a distance in an axial direction above the planar surface 113 of the anode, and may be positioned at a distance in a radial direction from the central axis.)

Any appropriate cathode, as understood by one of skill in the art, may be utilized here. In some embodiments, the cathode may be a thermionic hollow cathode or a thermionic filament.

The system may include a power supply 220 configured to apply voltage to the cathode and at least one of the plurality of electrodes. In some embodiments, the power supply is configured to apply a DC or modulated voltage to an inner electrode and/or an outer electrode to change an acceleration region and/or ionization region of the segmented wall-less Hall thruster. Specifically, the frequency and/or amplitude of the voltage may be adjusted to control the various regions.

Generally speaking, the ionization regions of the thruster may be, e.g., within about 3 cm, within about 2 cm, or within about 1 cm of the surface of the thruster (e.g., within 1 cm of the planar surface 113 of the anode). In some cases, that distance is 0.5 cm or less. The ionization regions may be positioned such that the region is centered above an outer edge of the anode.

The acceleration regions of the thruster may be, e.g., within about 3 cm, within about 2 cm, or within about 1 cm of the surface of the thruster (e.g., within 1 cm of the planar surface 113 of the anode). In some cases, that distance is 0.6 cm or less. The acceleration regions may be positioned such that the region is centered between the inner radius and outer radius of an anode.

In some embodiments, the power supply is coupled to at least one processor 230, the at least one processor configured to control an acceleration of the segmented wall-less Hall thruster by controlling the amplitude of a voltage provided by the power supply to at least one electrode of the plurality of electrodes and/or the cathode. As will be understood by those of skill in the art, the at least one processor may be coupled to a memory (not shown) and/or non-transitory computer-readable storage media (not shown) containing instructions that, when executed, configured the at least one processor to perform the necessary control steps.

It will be understood that any disadvantage in efficiency of the disclosed thruster compared to a higher performance conventional thruster may be counterbalanced by the potential for a longer operational lifetime and a simpler and less expensive design. Such smaller designs are more suitable for miniaturization required for low power Hall thrusters, especially with applications to small satellites such as CubeSats.

The disclosed thruster therefore enables long lifetime low power micro-propulsion for space applications. The disclosed system enables relatively high thrust vs system size with minimal plasma-facing materials, i.e., minimal erosion of the thruster parts. In addition to propulsion systems for space travel, Industrial applications of the disclosed device include, inter alia, material processing, for example, cleaning of surfaces.

Example 1

A prototype of the disclosed thruster was built and tested with a wall-less configuration and an additional segmented electrode. Measurements have shown the described increase in thrust, focusing of the plume, and decrease in power when utilizing the segmented electrodes. This segmented electrode was placed on the plasma facing wall of the thruster outside the anode. The variant with another segmented electrode placed on the same thruster wall but at the center of the thruster will be tested soon. This thruster may have only this central segmented electrode or both central and outside electrodes.

Figure 5:
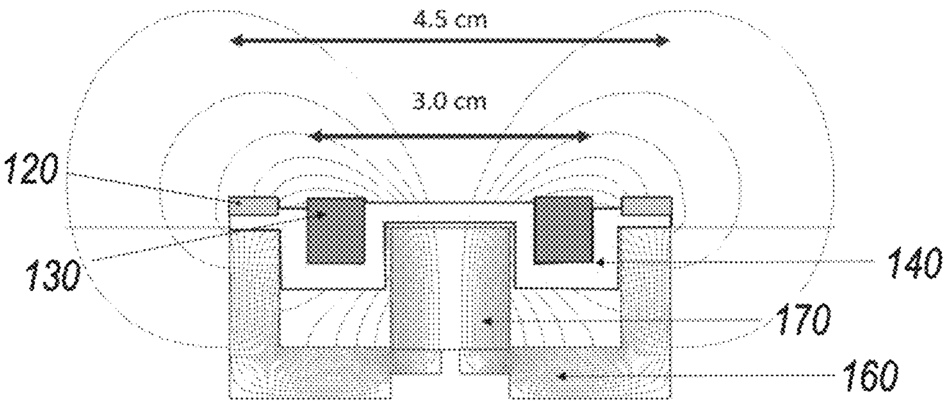
FIG. 5 is an illustration of the magnetic fields of a disclosed thruster simulated with nonlinear finite element method software.

This example describes the results of plasma and performance studies of a miniaturized 3 cm wall-less Hall thruster (see FIG. 5). As seen, the thruster magnetic field topology has two distinctive regions: (i) a fringing topology with a strong radial component of the magnetic field in front of the anode and (ii) a diverging axial magnetic field in the vicinity of the thruster axis. In each of these regions, electrons are bouncing along the magnetic field lines between the magnetic mirror at the thruster axis and the plasma wall sheath at the opposite side of the magnetic field lines [for region (i)] and the cathode potential in the plume [for region (ii)]. Thus, electrons are trapped along the magnetic field lines in a so-called magneto-electrostatic trap (MET). In this example, this wall-less Hall thruster may be referred to as the thruster with a magneto-electrostatic trap or an MET thruster. The measured results suggest that in the MET thruster, the ion acceleration in both region (i) and region (ii) contributes to the thrust. The ion acceleration in the fringing magnetic field (region i) is similar to that of conventional Hall thrusters with ExB fields, while the ion acceleration in the diverging magnetic field (region ii) is likely due to plasma expansion in this region. The latter is similar to what was observed and used in end-Hall thrusters or grid-less Kaufman sources. This region also exists to an extent in the cylindrical Hall thruster (CHT) and likely to a smaller extent in miniaturized annular Hall thrusters. Interestingly, these measurements suggest comparable contributions to ion acceleration and thrust from both regions.

Design Considerations of the Met Thruster

Figure 6A:
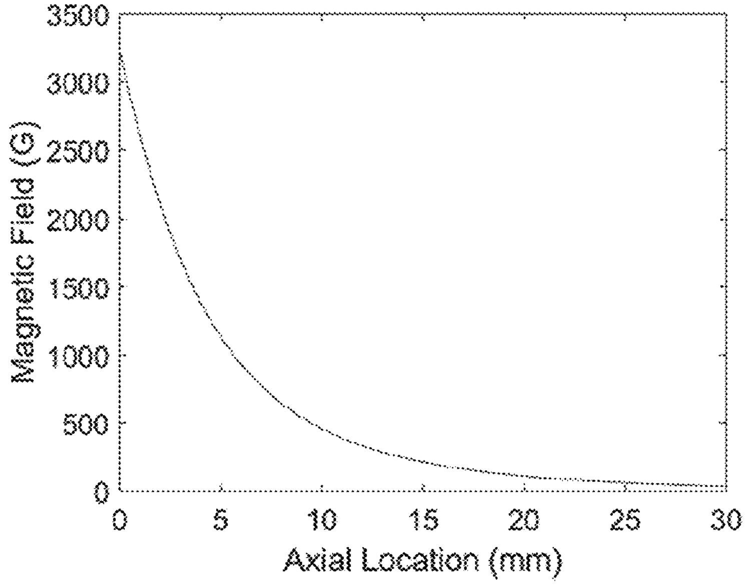
FIGS. 6A and 6B are graphs showing axial magnetic field vs axial location in the center of the thruster (6A), and axial and radial magnetic field vs axial location above the anode median (R=1.2 cm) (6B).
Figure 6B:
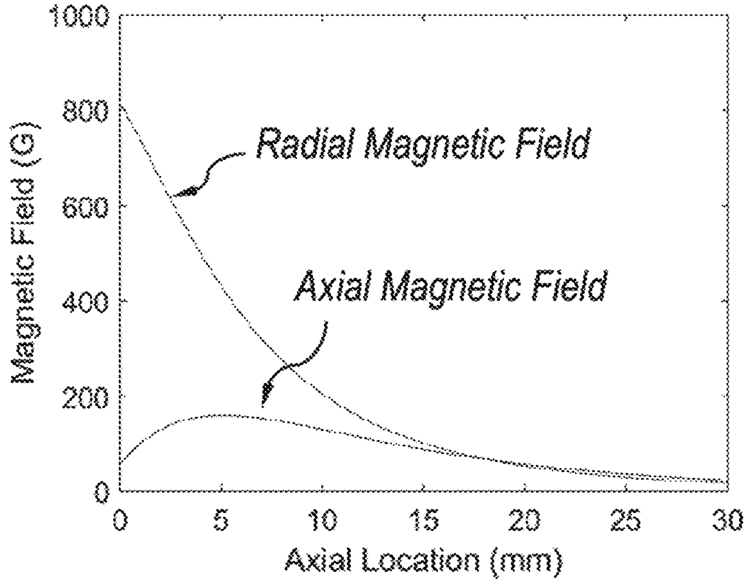

The magnetic field of the MET thruster is generated by a single central Samarium Cobalt (SmCo) permanent magnet placed behind the thruster plasma-facing (PF) wall (see FIG. 5). Results of non-linear magnetostatic simulations of the magnetic field in the MET thruster are shown in FIGS. 6A and 6B. The magnet is located in a magnetic core made from a high magnetic permeability low carbon steel, which directs the magnetic flux to produce high radial fields near the thruster anode (see FIGS. 6A, 6B), while reducing magnetic leakage out of the thruster body. The thruster plasma-facing (PF) wall is made from a boron nitride (BN) ceramic. The thruster anode is encased in this BN piece and is located near the region of high radial magnetic fields. The laboratory thruster described in this example has a characteristic size (anode outer diameter) of 3 cm (i.e., outer radius of 1.5 cm) and operates between 200 and 500 W (30-70 W/cm2) with temperatures below the working temperature of the SmCo magnet (~300° C.). No active cooling is used. In comparison, state-of-the-art annular Hall thrusters typically operate with lower power densities of 25 W/cm$^2$, while conventional wall-less Hall thrusters (WLHT) and low-power external-discharge plasma thruster (XPT) have been shown to each operate at ~20 W/cm$^2$.

A strong magnetic field inhibits the electron flow to the anode as the electrons can only move across field lines either because of their collisions with neutral atoms and ions or through scattering by plasma fluctuations. An estimate of the ionization length provides a qualitative view of the direction of ion acceleration. If one takes the mean free path of ionization to be $\lambda_i = v_n/(n_e<\sigma v_e>)$, where $v_n$ is the neutral velocity (assumed to be thermal with 700 K temperature), $n_e$ is the plasma density that is taken to be $10^{12}$ cm$^{-3}$ (a typical value of the maximum plasma density in Hall thrusters), $\sigma$ is the electron-Xenon neutral collision ionization cross section, and $v_e$ is the mean electron velocity, one can calculate the ionization mean free path of xenon atoms. By assuming electron temperature to be a tenth of the applied voltage of 300 V, as has been previously measured in Hall thrusters, one can get the ionization rate to be $<\sigma v_e>\sim 1.5\times10^{-7}$ cm$^{-3}$/s and the ionization mean free path is 0.14 cm. This length is well within the region of high radial magnetic fields≤1 cm (see FIGS. 6A, 6B). Thus, the effective ionization of the xenon gas supplied through the anode can be sustained within this region. Under the assumption of equipotential magnetic field surfaces, it is anticipated that the majority of ions would be borne by the anode in a region of a strong radial magnetic field and a strong axial electric field. The inward pointing asymmetry of magnetic fields was implemented to facilitate some degree of focusing of the ion plume by the associated inward radial electric fields.

Electrons move along the magnetic field lines and are confined by a magnetic mirror in the thruster center and the thruster edge, where the plasma-wall sheath is likely a dominant repelling mechanism. This effect of electron magnetic mirroring has been described in other wall-less thrusters and demonstrated in particle-in-cell (PIC) simulations. Magnetic mirroring of electrons has also been described in CHTs, where electrons instead are repelled by the high gradient in the axial magnetic field in the center and accelerated back toward the thruster body by low plume potentials. It is noted that as discussed herein, it is in the center of the MET that we observe a strong electric field in the axial direction, i.e., along the magnetic field lines.

Experimental Setup

Facility

Experiments were conducted in a 28 m$^3$ vacuum vessel equipped with three cryopumps that achieve a base pressure of $10^{-8}$ Torr, corrected for xenon. The xenon gas flow rate was measured with an MKS flow controller with a full scale of 15 SCCM and ±0.1 SCCM uncertainty. The anode flow rate in the thruster was varied in the range of 2-12 SCCM of xenon. A commercial hollow cathode was used as a cathode neutralizer and operated with a xenon flow rate of 2 SCCM, a cathode keeper current of 1.2 A, and a keeper voltage of 20 V. During thruster experiments, the background gas pressure in the vacuum vessel did not exceed 2 μTorr, corrected for xenon.

Diagnostics

Thrust was measured with a torsion balance thrust stand with two Riverhawk 5032-800 flex pivots to provide the restoring torque. A Micro-Epsilon optoNCDT-1420 laser was used for displacement measurements of the thrust stand. This provided a measurable thrust range of 0-50 mN with measurement uncertainty of ±0.03 mN due to the resolution of the laser.

The plume diagnostics used in these experiments, including a planar probe and a retarding potential analyzer (RPA), are known in the art. Plume measurements were conducted with a planar probe of diameter 1 cm at a distance of 73 cm from the channel exit that was rotated ±90° relative to the thruster axis. The probe was biased −40 V with respect to ground and has a guarding sleeve to minimize possible edge effects. This bias voltage was sufficient to reach saturation of the ion current collected by the probe. Ion energy was measured with a retarding potential analyzer (RPA) on this same rotating system, which allowed angular measurements of ion energy. The RPA in use was a two-grid system, which operates by applying a positive sweeping voltage to the first grid with respect to ground, which repels ions of energy/charge below this sweeping voltage. A second grid is negatively biased to repel electrons, resulting in the collected current constituting of ions above the sweeping voltage. The ion energy distribution function (IEDF) is found by finding the derivative of the collected current with respect to the sweeping voltage, and the mean ion energy is defined as the mean energy value over this distribution. The ratio of the mean ion energy to the applied anode voltage gives voltage utilization $\eta_{volt}$.

For plasma potential measurements, floating emissive probes were used. These probes are composed of 0.025 cm tungsten wire in alumina tubing with segmented graphite ringlet shielding, which have been found to reduce disturbances to the plasma. These probes were placed on a high-speed positioning system to provide spatial measurements. This positioning system has been described elsewhere. The same emissive probes without applied heating (i.e., cold probe) were used for the measurements of ion current distribution to deduce ion density distribution. For these measurements, the probe was connected to the ground and so floated negatively with respect to the plasma along the probe insertion path.

Finally, a separate stationary probe made from a 0.025 cm tungsten wire inserted in alumina tubing was placed near the thruster edge to monitor the effect of probe-induced plasma disturbances on the floating potential.

Measurement Procedures

Thrust and Plume

Thrust measurements were made after the steady-state operation of the thruster was achieved, which occurred after 20 min of operation. At this point, the thruster temperature was relatively stable, but a long timescale thermal drift of the equilibrium position of the thrust stand occurred due to heating by the thruster. To minimize these thermal effects, each thrust measurement was determined by measuring the displacement of the thrust stand as the thruster is operating and as it is turned off. The instantaneous equilibrium position at the time of thruster operation could then be determined, and the thrust was calculated by scaling the difference in displacement positions by the measured effective spring constant. This effective spring constant was re-calibrated periodically throughout the experiment with a motor-operated weight-pulley system that applied a known 19 mN force, and the spring constant was found to be almost unaffected by the heat. Each thrust measurement was repeated five times to determine a statistical error, which was found to be ±0.4 mN. We define specific impulse $I_{sp}$ and efficiency $\eta_{anode}$ in relation to the measured thrust (T), the mass flow rate through the anode ($\dot{m}$), and discharge power through the anode (P), $$I_{sp} = \frac{T}{\dot{m}}, \tag{1}$$

$$\eta_{anode} = \frac{T^2}{2\dot{m}P}. \tag{2}$$

The total ion current ($I_i$) obtained by the integration of the measured ion angular distribution was used to estimate ion current utilization, propellant utilization, and plume divergence. The current utilization is a measure of the total ion current generated in the thruster vs the discharge current in the power supply ($I_d$): $\Theta_{current}=I_i/I_d$. The propellant utilization is the ratio of the mass flow of ionized propellant vs the input propellant ($\dot{m}$): $\eta_{prop}=\dot{M}I_i/(e\dot{m})$. The plume divergence is a measure of the amount of ions accelerated in the radial direction, which does not contribute to thrust. In Hall thruster literature, this is typically defined in one of two ways: the 90% plume half-angle or the momentum weighted angle. The 90% plume half-angle is commonly used to measure the extent of plume divergence, which corresponds to the off-axis angle at which 90% of the ion current is measured, $$0.90(2\pi r_p^2\int_0^{\pi/2} j_i \sin\theta d\theta)=2\pi_p^2\int_0^{\theta 50\%} j_i \sin\theta d\theta, \tag{3}$$

where $r_p$ is the distance between the probe face and the thruster, $j_i$ is the measured ion current, θ is the off-axis probe angle, and $\theta_{90\%}$ is the 90% plume half-angle. In contrast, the momentum-weighted angle is related to the plume divergence efficiency as it relates the average angle at which ions are accelerated, assuming constant ion velocity over the plume angle. This angle $\theta_{nom}$ is written as $$\theta_{mom} = \cos^{-1}\left(\frac{\pi r_p^2\int_{-\pi}^{\pi} j_i \sin\theta\cos\theta d\theta}{\pi r_p^2\int_{-\pi}^{\pi} j_i \sin\theta d\theta}\right). \tag{4}$$

The momentum-weighted angle relates to thruster efficiency $\eta_{total}$ by plume divergence efficiency $\eta_{div}$, assuming there is no angle dependence of ion velocity, $$\eta_{div}=\cos^2\theta_{nom} \tag{5}$$

$$\eta_{total}=\eta_{div}\eta_{current}\eta_{prop}\eta_{volt} \tag{6}$$

Plasma Properties

The plasma potential ϕ and electron temperature $T_e$ were determined by measuring the floating potential of both emissive and cold probes ($\phi_e$ and $\phi_c$, respectively) and relating their relative sheath potentials under the assumption of the Maxwellian electron energy distribution function (EEDF): $\phi=\phi_e+1.5T_e$ and $$T_e = \frac{(\phi_e - \phi_c)}{4.27}.$$

This factor of 1.5 is consistent with the measurements of the sheath at emitting surfaces in flowing plasmas such as those that exist in Hall thrusters. Plasma density measurements were conducted in the thick sheath regime, as the approximate measured sheath thickness (~0.1 cm) was over two times larger than the probe diameter. Plasma density was determined by relating the collected ion saturation current to plasma density for the expanding sheath:

$$n = \frac{I_i \pi}{2eA_p}\sqrt{-\frac{2M}{eV}},$$

where $A_p$ is the probe area, V is the probe potential with respect to the surrounding plasma, and e is the charge of the electron. Here, it was also assumed the EEDF to be Maxwellian and assumed ions were singly charged.

Throughout all measurements of spatial properties reported in this article, both the discharge current and a stationary floating probe near the thruster edge monitored plasma disturbances induced by fast probe insertion. In the reported measurements, the disturbances of the discharge current and the floating potential of the stationary probe did not exceed 10% of their steady-state values.

Note that due to harsh plasma environments near the thruster PF wall, the emissive probes only survived 1-3 insertions each experiment, and so plasma potential and electron temperature were only collected at one operating regime of the MET thruster: 250 V discharge voltage and 6 SCCM flow rate. Plasma potential and electron temperature were measured along the anode median and 0.3 cm radial increments above the median. Measuring at radial positions below the anode median resulted in the emissive probe immediately burning up, and so spatial measurements were not obtained there.

Results

Plume Measurements

Figure 7A:
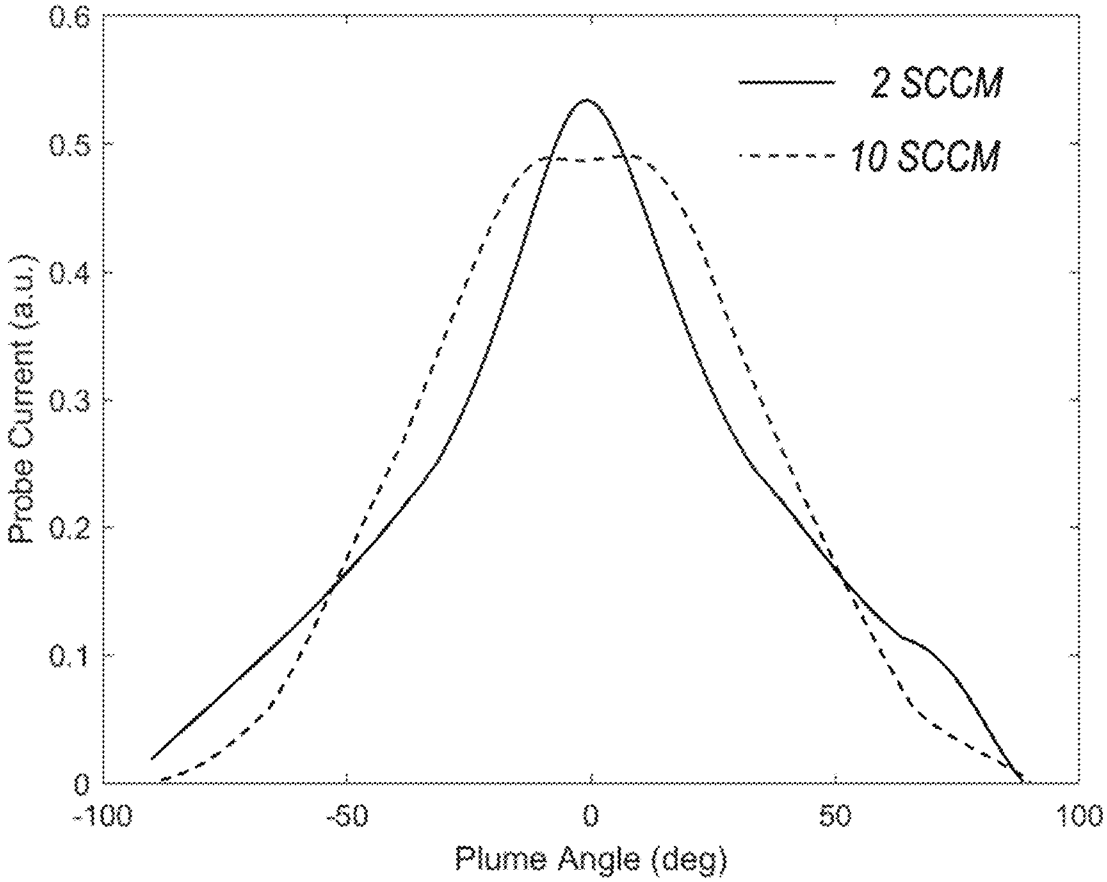
FIG. 7A is a graph showing a measured angular ion current distribution for a thruster at 300 V at 2 and 10 SCCM.

The angular ion current distribution in the plume of the MET thruster was measured for xenon gas flow rates between 2 and 12 SCCM and discharge voltages of 200, 250, and 300 V. FIG. 7A shows a measured angular ion current distribution for the MET thruster at 300 V at 2 and 10 SCCM as representative samples of the distributions. Ion current distribution is normalized by the total ion current.

Figure 7B:
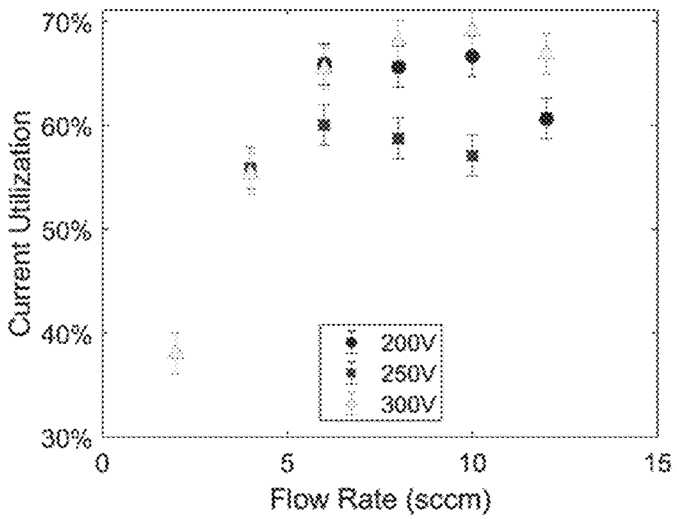
FIGS. 7B and 7C are graphs showing the effect of the xenon gas flow rate on propellant utilization (7B) and current utilization (7C) for different discharge voltages. Error bars in both plots correspond to one standard deviation of multiple measurements taken at the regime with the flow rate of 6 SCCM and the discharge voltage of 300 V.

Measurements of propellant utilization (see FIGS. 7B, 7C) show that 90%-100% of propellant is ionized at discharge voltages of 200 and 300 V, with a slight increase as the flow rate increases. Curiously, at discharge voltages of 250 V, the propellant utilization exceeded unity. This result is similar to that observed for the CHTs at similar voltages. Measurements of state-of-charge of ions in CHTs showed that such unusually high propellant utilization is due to a large fraction of multiply charged ions present in the plume of the CHT. It is reasonable to suggest that multi-charged ions are also generated by the MET thruster, which can explain the propellant utilization of higher than unity measured at the discharge voltage of 250 V. As the ionization mean free path is inversely proportional to the plasma density, the increase in propellant utilization is expected with the gas flow rate. The current utilization of the MET thruster ranges between 60% and 70%, which is a significant source of inefficiency in the MET thruster.

Figure 7C:
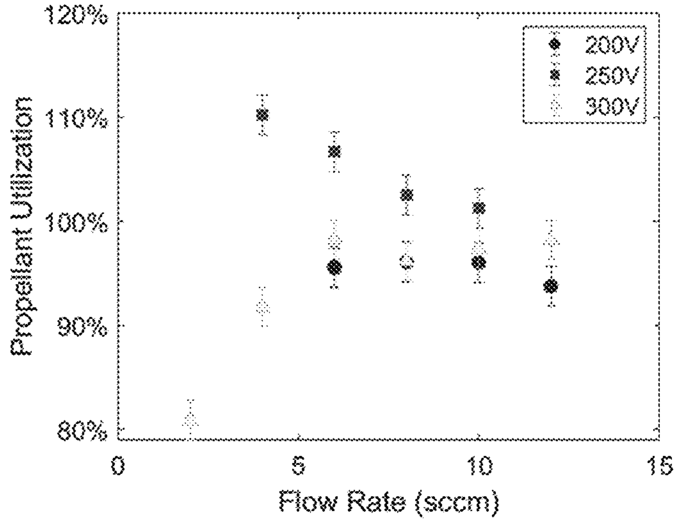
Figure 7D:
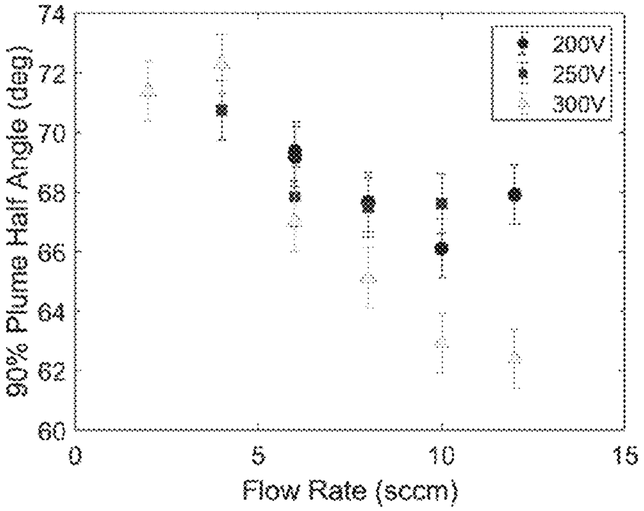
FIG. 7D is graph showing plume narrowing with the increase in the xenon gas flow related to FIG. 7A. Measurement uncertainties are estimated to be ±1° for the plume angle.

The plume angle deduced from the measured angular ion current distribution (see FIG. 7A) for the MET thruster is shown in FIG. 7D. The plume tends to become more focused as the mass flow increases. This can be particularly seen for discharge voltages of 300 V. These results are generally similar to that of other wall-less thrusters. The momentum-weighted angle [Eq. (4)] ranges between 36° and 45° for the MET thruster, while the 90% plume angle [Eq. (3)] ranges between 62° and 72°. This large plume divergence is likely due to ionization and ion acceleration in the fringing magnetic field where the electric field is defocusing.

The IEDF was measured at different angular positions of the RPA with respect to the thruster and the angular distribution of the mean ion energy. The IEDF has a relatively large population of low energy ions, which may imply an overlap between ionization and acceleration regions or some contribution from charge-exchange collisions.

Figure 8:
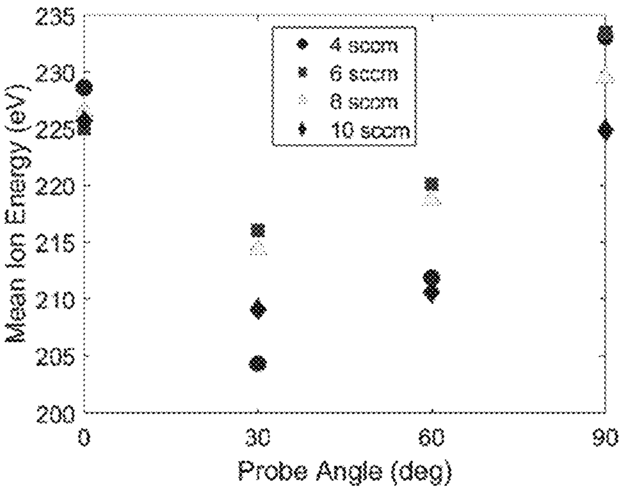
FIG. 8 is a graph showing the effect of the xenon gas flow rate on the angular distribution of the mean ion energy.

Measurements of mean ion energy show an overall efficient acceleration of ions with energies of 85%-90% of the applied voltage, both on-axis and 90° off-axis. Referring to FIG. 8, a curious feature of the results is the presence of the minimum mean ion energy between 30° and 60°: the mean ion energy was higher at 90° off-axis than angles closer to the axis. This high mean ion energy with the minimum at ~45° off-axis occurred over all measurements.

The high mean energies of ions at large plume angles are also unusual: in conventional Hall thrusters, ion energy decreases at large angles. For the MET thruster, this waste of power into radial acceleration is apparently a source of inefficiency.

Plasma Properties in Ionization and Acceleration Regions

Figure 9A:
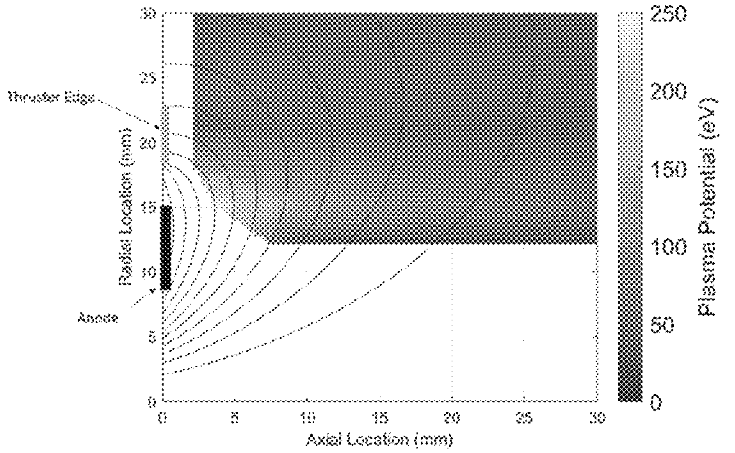
FIG. 9A is a plasma potential profile measured in the MET thruster operating at the discharge voltage of 250 V and a xenon gas flow rate of 6 SCCM. The magnetic field lines obtained from non-linear magnetostatic simulations are superimposed. Region of probe disturbance removed from the plot.
Figure 9B:
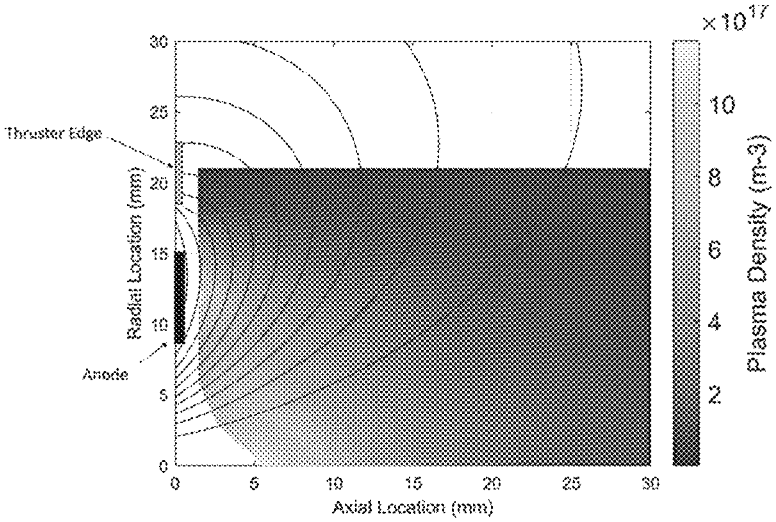
FIG. 9B is a density profile measured in the MET thruster operating at the discharge voltage of 250 V and a xenon gas flow rate of 6 SCCM. The magnetic field lines obtained from non-linear magnetostatic simulations are superimposed. Region of probe disturbance removed from the plot

The measured distribution of the plasma potential is shown in FIG. 9A, 9B with magnetic field lines superimposed. Interestingly, the equipotential assumption appears to only weakly hold near the anode. The acceleration region near the anode median is also shown to be within 0.6 cm of the thruster PF wall, with an expanded potential structure by the anode edge. Such a "spike" of potential was also observed in other Hall thrusters and attributed to electron fluxes along the magnetic field lines that alter the magnetic field surfaces from equipotentiality. For conventional annular Hall thrusters, it was theorized that these radial fluxes are caused by radial pressure gradients along the magnetic field lines and differences between magnetic field topology at the inner and outer walls of the annular thruster channel. In the MET thruster, a strong magnetic field and pressure gradients in the radial direction exist as well. They may also account for a significant departure of equipotentials from magnetic field surfaces. The resulting radial electric fields may be responsible for large plume divergence and high energy of ions accelerating from the thruster at large plume angles. There also exists considerable inward-focusing electric fields, which suggest that ions are being focused toward the center of the thruster. These ions are either accelerated past the center to contribute to divergence losses or experienced some outward force to "straighten" the ions toward the axis, as has been suggested in CHTs.

Similar to all Hall thrusters, the electron cross-field current ($I_e=I_d-I_i$) in the MET thruster is much larger than the electron current expected to be carried out by classical collisional processes. This can be shown using a one-dimensional Ohm law, $$I_e = \left(en_e\mu\left(E + \frac{1}{en}\nabla_z P\right)A_{anode}, \right. \tag{7}$$

where $A_{anode}$ is the anode area, $1/en\nabla_z P$ is the plasma pressure gradient toward the thruster exit (approximately −20 V/cm, from plasma density and electron temperature measurements), E is the electric field (~200 V/cm, from the plasma potential measurements), and μ is the electron cross-field mobility. Here, the electron cross-field mobility is $$\mu = \frac{e}{m_e}\frac{\nu}{\nu^2 + e^2B^2/m_e^2}, \tag{8}$$

where $m_e$ is the electron mass and ν is the electron collision frequency.

Using measured spatial variations of the plasma properties (plasma potential and the plasma density) and the magnetic field at the anode median, we can estimate the collision frequency that is required to match the measured current utilization (see FIG. 7C). For the MET thruster, this collision frequency is on the order of $10^9$ Hz that is three orders of magnitude higher than that expected by electron-neutral collisions. Note that this anomalously high collision frequency is of the same order as that of the Bohm value $$\nu_B \sim \frac{eB}{16m_e} \sim 10^9 \text{ Hz}.$$

Thus, the enhanced electron cross-field current explains the relatively low current utilization observed in the MET, as compared to propellant and voltage utilization. This enhanced transport can be attributed to the presence of strong plasma oscillations such as the ExB rotating spoke, which has been shown to increase the electron cross-field transport. Indeed, the azimuthal spoke oscillations were also observed and measured in the MET thruster and the WLHT.

Figure 10:
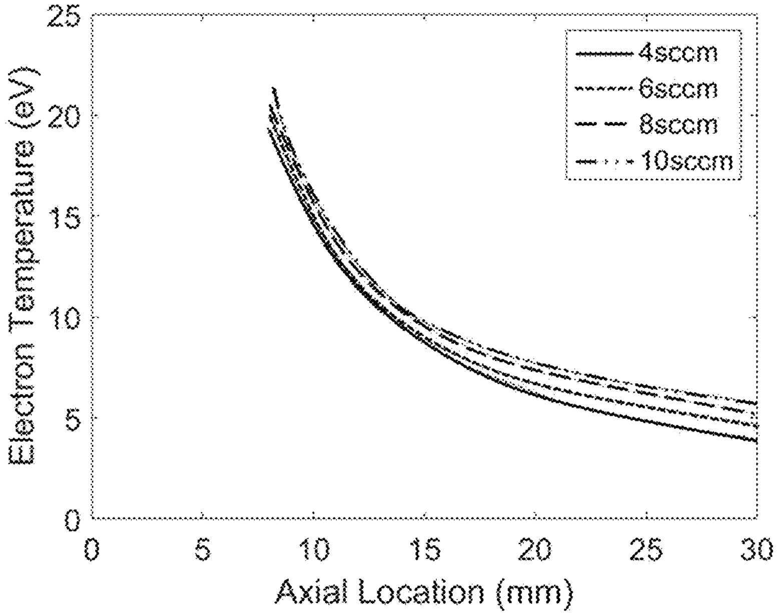
FIG. 10 is a graph showing the effect of the gas flow rate on the electron temperature distribution along the axis of the MET thruster at 1.5 cm from the thruster centerline (the outer edge of the anode). Measurements were conducted for the discharge voltage of 250 V.

Measurements of the plasma potential (FIG. 9A) and plasma density (FIG. 9B) show the acceleration region to be within 1 cm of the anode and the ionization region to be within ~0.3 cm from the thruster anode. This ionization region appears to be small due to high electron temperatures in the region, as the measured electron energy reached ~20 eV within 1 cm of the anode (see FIG. 10). The high electron temperatures may account for high propellant utilization determined from plume measurements (see FIGS. 7B, 7C). The measured data do appear to fit both the prediction of electron temperatures that are ~1/10 of the applied voltage and the associated short ionization length. Furthermore, there is another peak of plasma density at the center of the thruster. Here, the plasma density is comparable to the maximum plasma density measured near the anode (FIG. 9B). Measurements at the thruster center (see FIGS. 11A, 11B) show temperatures as high as 40 eV, which correspond to ionization mean free paths of ~0.1 cm.

Figure 11A:
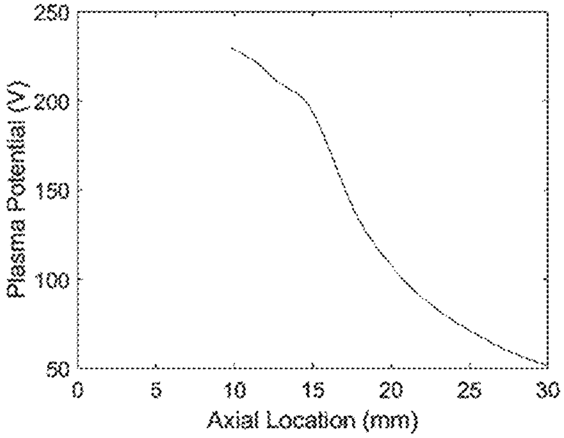
FIGS. 11A and 11B are graphs showing spatial profiles of the plasma potential (11A) and the electron temperature (11B) measured in the center of the MET thruster at the discharge voltage of 250 V and the xenon flow rate of 6 SCCM. Results are only shown for the region with minimal probe-induced plasma disturbances.
Figure 11B:
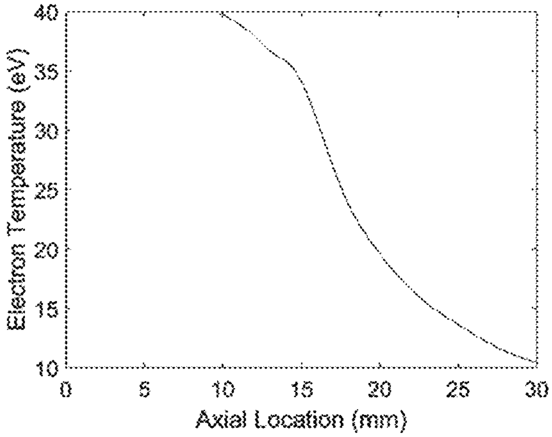

From plasma potential measurements along the thruster centerline, the potential profile appears to be similar to that observed in the near anode region with a strong radial magnetic field (FIGS. 11A, 11B). Here, a plasma potential of 230 V was measured 1 cm from the thruster. The presence of a such a high plasma potential in the central region of the MET may be associated with a high ambipolar potential due to high electron temperatures (~40 eV; see FIG. 11B) or some enhancement of electron cross-field transport between the near-anode region and the thruster center, causing the plasma near the thruster surface to be about the anode potential. A somewhat similar result was also measured in the CHT, though the presence of a short annular channel caused the measured potential to be almost 2.5 times lower than the anode voltage (250 V). However, unlike for the CHT case, measurements for the MET thruster show a strong potential drop along the centerline toward the plume (see FIG. 11A). At a distance between 1.5 and 2 cm from the thruster, the plasma potential drops from 200 to 100 V.

In principle, under the assumption of equipotential magnetic field surfaces, one would expect the magnetic field lines at the thruster axis of both the MET thruster and the CHT to be closer to the cathode potential. Apparently, this is not what was observed in the experiments for both thrusters. Moreover, LIF measurements in CHT showed ion acceleration along the thruster axis. It was suggested that this acceleration is due to the effects of supersonic rotation of the electrons in the Hall thruster plasma—it has been shown that the centrifugal force of the electrons deflects the electric field axially, straightening the force vector and pushing a component of the electric field along the magnetic field line. The extent to which this is responsible for the potential along central field lines needs further investigation. Other potential explanations include pressure gradients leading to a rapid plasma expansion in the diverging magnetic field, or perhaps the presence of a strong magnetic mirror may be responsible for strong variations of the electric potential along the magnetic field lines. However, the magnetic mirror effect would require anisotropy of the EEDF, which to our knowledge has only been simulated and never measured for the wall-less thrusters and for Hall thrusters in general.

The presence of strong pressure gradients along the magnetic field lines with peak plasma density at the thruster center is confirmed by results of the probe measurements of plasma density (see FIG. 9B). The peak density at the center of the thruster has a similar magnitude to the maximum plasma density in the vicinity of the anode. A similar radial density profiles with a characteristic peak at the thruster center were also observed in the miniaturized 2.6 cm CHT thruster. It was proposed that this density peak is a result of the electrostatic trapping of low energy ions produced by charge-exchange collisions in this region of the thruster with counter-streaming ion flows accelerated from the anode region of the CHT. From plasma potential and plasma density measurements near the MET thruster, it appears that this thruster has two regions from which ions are accelerated and generate the thrust by two distinctive mechanisms. For the near anode region of the MET thruster, the ion acceleration is likely dominated by ExB fields due to the high radial magnetic fields, while for the thruster center, the ions are accelerated by an electric field along the magnetic field lines. This electric field is likely formed by a combined operation of ambipolar effects due to the pressure gradients along the diverging magnetic field and magnetic mirror effects.

Interestingly, for the CHT, the maximum plasma potential and the maximum plasma density at the axis and the plasma appear to be affected by the thruster diameter. For example, for a 9 cm diameter CHT thruster, the potential was about 40 V, which is about twice smaller than that of the smaller 2.6 cm diameter counterpart. Note that the xenon flow rate of the 9 cm CHT was only three times larger than the flow rate of the 2.6 cm CHT, leading to an increase in the neutral density of roughly a magnitude of four. In contrast to the 2.6 cm CHT, the MET thruster operates with a higher mass flow and consequently has a neutral density roughly double that of the 2.6 cm CHT as well as higher plasma potential and density in the center. The scaling of the plasma potential and plasma density at the thruster center for these smaller thrusters may imply that the ion acceleration in a diverging magnetic field may be characteristic of miniaturized thrusters with applied magnetic fields (i.e., Hall thrusters, CHTs, wall-less Hall thrusters, etc.). This result may be somewhat general as the divergence of the magnetic field in the center increases as the thruster diameter decreases, whether by design or through simple scaling of the thruster size, and this increase in magnetic divergence may lead to higher ion acceleration driven by mirror or ambipolar pressure effects. The position of the anode may also have some effect on this central potential profile, as measurements have shown the general discharge characteristics and the efficiency of the miniaturized CHT is heavily dependent on this position.

Performance Measurements

Figure 12A:
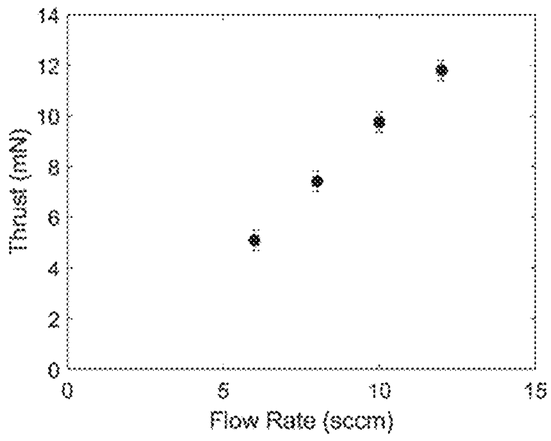
FIGS. 12A-12D are graphs of measured performance of a disclosed thruster operated at the discharge voltage of 250 V: Thrust (12A), specific impulse (12B), power (12C), and efficiency (12D).
Figure 12B:
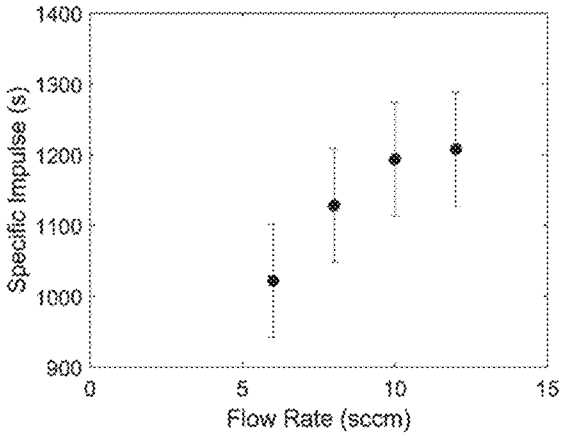
Figure 12C:
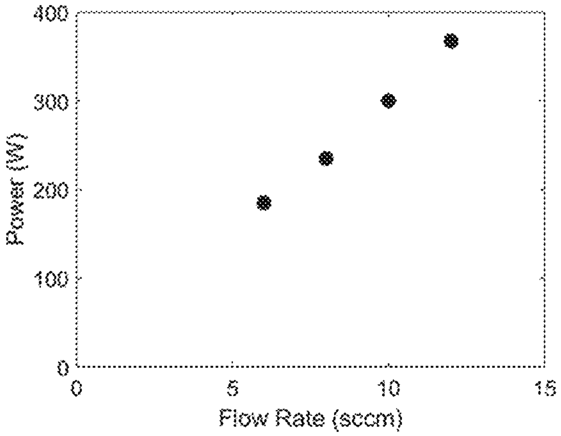
Figure 12D:
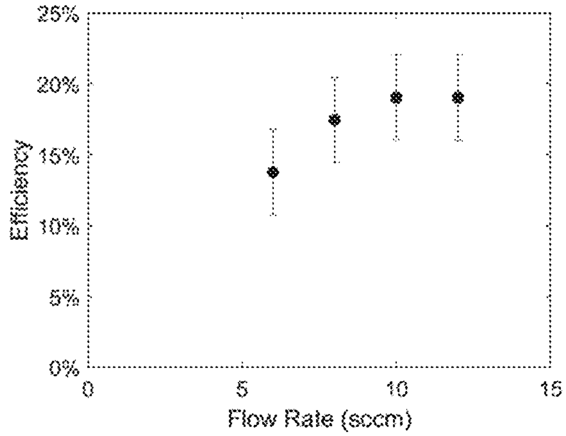

Thrust and power increased somewhat linearly with the flow rate (see FIGS. 12A, 12C). A small increase in specific impulse with the flow rate is also observed (see FIG. 12B). This increase in specific impulse appears to be driven by the decrease in plume divergence with the flow rate (see FIG. 7D), as mean ion energy was relatively constant with the flow rate (see FIG. 8). The higher specific impulse resulted in an increase in efficiency from –14% to –20% when the flow rate increased from 6 to 12 SCCM. A relatively low efficiency of this thruster (see FIG. 12D) appears to be primarily due to large plume divergence and, to a lesser extent, low current utilization.

Plume divergence efficiency as defined by Eq. (5) gave values of ~50%, which is much lower than conventional Hall thrusters, while current utilization was ~60%-70% (see FIG. 7B). This is in contrast to high propellant utilization (>90%) and voltage utilization (~90%). Measurements of off-axis ion energy (see FIG. 8) may explain some of this inefficiency; ions at large plume angles were measured with high energies that do not contribute to thrust. In contrast, Hall thrusters typically have low ion energy at large plume angles, i.e., less power wasted on ions accelerated radially to large plume angles.

Remarks on the Magnetic Mirror Effect

Figure 13A:
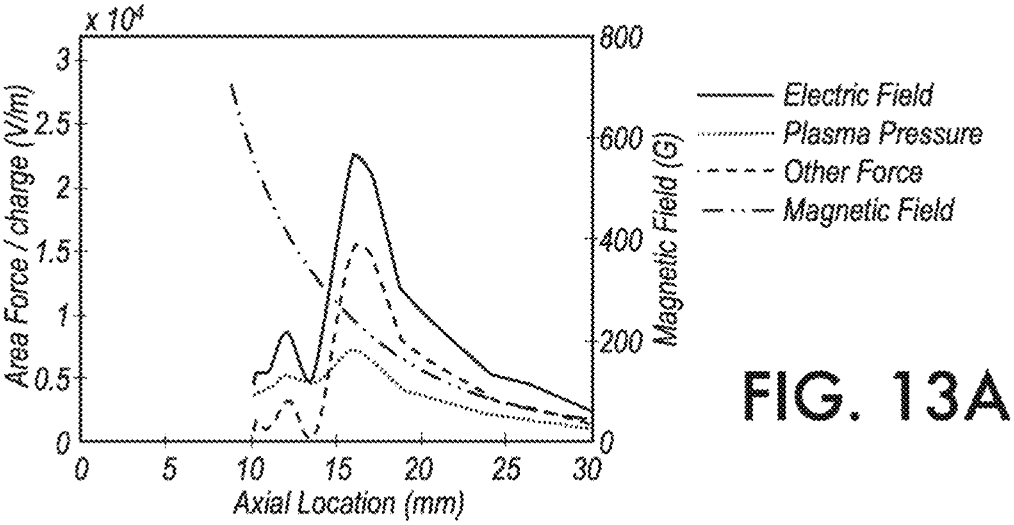
FIGS. 13A and 13B are graphs showing an analysis of the magnetic mirror effect in the MET thruster: (a) Measured axial electric field, plasma pressure, and the unaccounted force vs axial location in the thruster center (13A) (magnetic field in the center is shown for reference) and (b) estimated electron energy anisotropy factor vs axial location (13B). Here, $\xi=1$ constitutes a fully isotropic plasma, assuming unaccounted force is due to magnetic mirroring.

The mechanism of the ion acceleration in the central part of the MET thruster requires more detailed theoretical and experimental studies. In this regard, one of the most interesting results reported here is a strong potential difference along the magnetic field lines at the thruster centerline. While the high potential (~230 V) can be described by the formation of a sheath along the floating thruster surface, the physics behind the strong electric field is currently unknown, as the measured plasma pressure gradient is lower than the electric field, implying some other mechanism than ambipolar plasma expansion is at play (see FIGS. 13A, 13B). This mechanism could be due to a variety of factors, such as electron centrifugal effects on the electric field, magnetic nozzle effects, or magnetic mirror effects. Here, we shall consider the possible effect of the magnetic mirror on the potential difference in this region, such as that found in the diverging section of a typical magnetic nozzle. The plasma acceleration in the diverging magnetic field or magnetic mirror with an applied electric field was previously considered for propulsion application by others, where it was determined that this magnetic mirror generated an ion-accelerating electric field in the end-Hall thruster for non-magnetized ions. They measured a roughly similar potential drop (~70-100 V) along the axial magnetic field. This potential drop was approximated by the following relation:

$$V_1 - V_2 = kT_e/e\ln\left(\frac{B_1}{B_2}\right), \tag{9}$$

where $V_1$ and $V_2$ are the plasma potentials upstream and downstream, respectively, and $B_1$ and $B_2$ are the magnetic field upstream and downstream, respectively. The end-Hall thruster geometry is similar to the central region of the MET thruster. Extending previous analyses, the electron fluid momentum balance equations in the center of the thruster relate the electric field to magnetic mirror pressure and the plasma pressure by taking into account the anisotropy of the electron energy, $$E_z \sim \frac{1}{e}\left(\frac{T_{\parallel} - T_{\perp}}{B}\right)\frac{dB}{dz} - \frac{1}{en}\frac{d(nT_{\parallel})}{dz}, \tag{10}$$

where $T_{\parallel}$ is the electron energy along the magnetic field, $T_{\perp}$ is the energy orthogonal to the magnetic field, and B is the magnetic field. Here, one can neglected plasma resistivity in the center as this term is much smaller than the electric field in the worst-case scenario where all current (1 A) flows through the central region of radius 0.4 cm (plasma resistivity ~0.01 V/cm and E~200 V/cm).

Although there is no experimental evidence of electron temperature anisotropy for Hall thrusters including for conventional annular Hall thrusters, CHT and wall-less thrusters, PIC simulations have predicted anisotropic EEDF with electron energy in the direction of perpendicular to the magnetic field (i.e., in the direction of the electric field) to be several times higher than that parallel to the magnetic field. The heating of electrons by the electric field and losses of energetic electrons to walls were the main causes of this anisotropy in simulations. Another source of the anisotropy could be the injection of electrons from the cathode to the diverging magnetic field. Energetic electrons from the cathode may result from the acceleration of the thermionically emitted electrons in the cathode sheath or generated in the hollow cathode plasma. It is not clear whether any of these mechanisms can be applied for this analysis of the MET thruster, but it is instructive to determine what level of anisotropy is required to explain the potential difference along the field line measured in the wall-less thruster. For that purpose, one can introduce the factor of anisotropy that is determined by equating the measured electric field and the plasma pressure to the unaccounted force (see FIGS. 13A, 13B), which is assumed to be the magnetic mirror force. Here, =1 represents a fully isotropic plasma, $$T_{\perp} = \xi T_{\parallel}, \tag{11}$$

$$E_z = -\frac{1}{en}\left(\frac{(\xi - 1)nT_{\parallel}}{B}\frac{dB}{zz} + \frac{d(nT_{\parallel})}{dz}\right), \tag{12}$$

$$\xi = \frac{B}{nT_{\parallel}\frac{dB}{dz}}\left(-E_z en - \frac{d(nT_{\parallel})}{dz}\right) + 1. \tag{13}$$

The emissive probe diagnostic used in this study did not solely measure the parallel portion of electron temperature as the probe is larger than the electron gyroradius, and so the measurements of electric field, density, and electron temperature cannot be used in Eq. (13) to definitively determine this anisotropic factor.

Figure 13B:
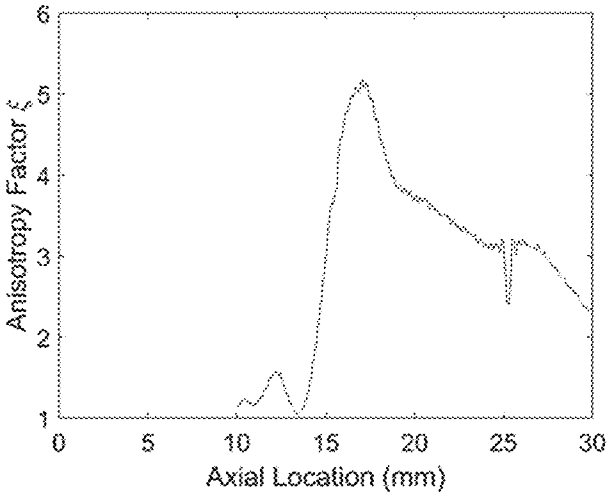

In the absence of such measurements, under the assumption that the temperature measured in the emissive probe was in the parallel direction, one can come up with some estimate of the anisotropy factor using Eq. (13). Plots of this estimate are shown in FIG. 13B, where the deduced anisotropy of the electron energies is relatively isotropic in the plume (ι~1 at >3 cm from the thruster surface) and is anisotropic in the acceleration region where the gyromotion electron energy appears to dominate by a factor of 5. While this appears to follow what would be expected in a magnetic mirror, it should be stressed that this is under dubious assumption that the emissive probe is measuring the parallel electron temperature.

It is noted that under the above assumptions, the electrons should become isotropic upstream of the high electric field about 1 cm from the thruster. Calculations of the relative frequencies in the plasma show that the electron gyrofrequency (~$10^{10}$ Hz) is several orders of magnitude above the electron neutral collision frequency (~$10^6$ Hz) and the electron-electron collision frequency (~$10^7$ Hz), and so it is unlikely that isotropization is the result of electron collisions with other particles. Physical mechanisms that may potentially be responsible for this isotropization include, but are not limited to, plasma instabilities such as the spoke or the interaction of plasma electrons trapped in the MET thruster and secondary electrons emitted from the boron nitride wall. For electron temperatures above 30 eV, the secondary electron emission from the boron nitride can reach 100%.

It is noted that if this isotropization is maintained near the thruster surface and the mirror is nullified, one would expect a sheath to form on the thruster surface with the following corresponding plasma potential:

$$\Delta V_{floating} \approx T_e\left(0.5 + \ln\sqrt{\frac{M}{2\pi m_e}}\right) = 230V.$$

This may explain the high plasma potential observed in the thruster center.

Swirl acceleration in magnetic nozzle thrusters can form a significant portion of the thrust. This thrust is generated when magnetized ions are demagnetized and, due to the conservation of energy, transfer their azimuthal energy to axial energy. This is generally not found in Hall thrusters as the magnetic fields are chosen such that only electrons are magnetized. However, in the center of the MET thruster, xenon ions with thermal velocities, such as those newly ionized by electron-neutral collisions or charge exchange, are magnetized due to their low gyroradius of ~0.1 cm, which is well below the length scale of the thruster. The high plasma density in the center of the thruster (see FIGS. 9A, 9B) indicates there may be a considerable population of magnetized xenon ions. However, it is unlikely that swirl acceleration plays a large role in the xenon-fed MET thruster, as the ions cannot gain more than ~1 eV of energy in gyromotion before losing magnetization. Still, the relatively strong axial component of the applied magnetic field (see FIGS. 6A, 6B) may affect the trajectory of new ions and warrants further investigation.

Remarks on Contributions of Different Regions to Thrust

The presence of peak plasma density at the center of the thruster and a strong electric field along the magnetic field may constitute a significant portion of the thrust. The degree to which this contributes to the total thrust can be calculated with the plasma potential and density measurements. The thrust in each area of interest was calculated as)

$$T=\int_{R_e}^{R_f} 2\pi r \int neE_z dz dr, \tag{14}$$

where $R_f$ and $R_0$ are the upper and lower radial bounds of the integrating area. For the sake of this simplified analysis, the center portion of the thruster is considered to be within 0.4 cm radius (where the density is high in FIGS. 9A, 9B) and assumes that the plasma potential profile in this region is the same as that measured along the centerline. The anode portion is considered to be between 0.9 and 1.5 cm radius. Through this method, the total thrust calculated for this 6 SCCM regime was 4.8 mN, which is in agreement with the measured thrust of 5 mN. The fraction of thrust due to acceleration from the near anode region is then found to be ~80%, while the fraction in the center is ~20%. This suggests that an appreciable portion of the thrust is due to non-Hall acceleration and underlies the nonconventional behavior of the MET thruster. This result may also be applicable to similar miniaturized plasma thrusters with ExB fields. Curiously, the corresponding thrust densities in both regions are comparable, ~8.5 $N/m^2$.

Note that in the above analysis of thrust generation, ion acceleration by the plasma pressure gradient toward the back wall of the MET thruster was neglected. In principle, if this acceleration takes place, the generated thrust should be compensated by the ion dynamic pressure on the backwall. Although the net thrust by ions would be zero, this would cause erosion of the back wall. This effect depends on the potential drop between the plasma and the back wall.

Conclusions for Example 1

The MET thruster demonstrates high propellant (90%-100%) and voltage utilization (~90%). This high propellant utilization is due to a short ionization region (<0.5 cm) formed near the thruster surface, which appears to occur because of high electron temperatures (~20-40 eV) measured in this region.

The capability to suppress spoke instability may be added through the use of segmented anodes with resistive circuitry or externally driving the breathing mode by modulating the anode voltage. The acceleration of ions to high energies at large off-axis plume angles is also a large source of thruster inefficiency that needs to be addressed in future designs. This large plume divergence is of particular practical concern for operation on spacecraft: the plume may impinge on spacecraft components such as solar panels, and so it is critical to focus the plume further. Were this plume divergence to be reduced such that all ions were accelerated axially, the efficiency of this thruster would be comparable to that of a conventional Hall thruster at low powers: ~35%-40% at 200 W. Measurements of plasma potential demonstrated an acceleration region within 1 cm of the thruster anode in a region of high magnetic field. While the ion acceleration in the near-anode region is driven by an electric field setup by impeding the electron flow in the axial direction across the magnetic field, the axial electric field of a similar magnitude (~200 V/cm) was measured in the center of the thruster where the magnetic field is axial, and electrons can move axially bouncing along the field lines between the magnetic mirror near the thruster and the cathode potential in the plume.

Plasma potentials close to the applied voltage were measured in the central region and dropped along the field lines toward the cathode. The mechanism behind this central acceleration region is still unclear. For example, the plasma pressure gradient is too small to account for this electric field. It is suggested that the magnetic mirroring of the electrons in the center could play a significant role in this acceleration. Measurements found a high plasma density both near the anode (away from the thruster centerline) and in the center of the thruster. This suggests that both the center of the thruster and a peripheral region of the thruster around the anode play comparable roles in thrust generation. One of the implications of this result is that unlike annular Hall thrusters with coaxial channels in which plasma is bounded by inner and outer walls, the MET thruster utilizes the whole thruster area to generate the thrust.

What is claimed is:

1. A segmented wall-less Hall thruster having an axial axis;

the segmented wall-less Hall thruster comprising:

an anode configured to function as a gas distributor;

a cathode; and an insulator and an additional electrode that each circumscribe the axial axis and are concentric with the anode about axial axis, wherein the insulator has a first surface, the first surface having a first surface radially inner portion and a first surface radially outer portion separated radially from each other by a recess therebetween, the recess extending into the first surface in an axially upstream direction, wherein the first surface, the first surface radially inner portion, the first surface radially outer portion and the recess each circumscribe the axial axis and are concentric with the anode about the axial axis;

wherein the anode is inserted into the recess so that a portion of the anode is axially upstream of the first surface, wherein a downstream-most surface of the anode is coplanar with or protrudes axially downstream of the first surface, wherein the additional electrode is separated from the anode radially by the first surface radially inner portion or the first surface radially outer portion, wherein the anode and the additional electrode are configured to be held at different electrical potentials, wherein the segmented wall-less Hall thruster generates ions during operation so as to provide thrust, wherein a power supply applies a voltage to the additional electrode such that the additional electrode focuses the ions and increase the thrust while reducing power consumption thereby increasing an operating efficiency of the segmented wall-less Hall thruster.

2. The segmented wall-less Hall Thruster of claim 1, having a magnetic core.

3. The segmented wall-less Hall thruster according to claim 1, wherein the magnetic core comprises low carbon steel.

4. The segmented wall-less Hall thruster according to claim 2, wherein the magnetic core comprises a permanent magnet.

5. The segmented wall-less Hall thruster according to claim 4, wherein the permanent magnet comprises samarium cobalt and/or neodymium.

6. The segmented wall-less Hall thruster according to claim 2, wherein the magnetic core comprises an electromagnetic coil.

7. The segmented wall-less Hall thruster according to claim 1, wherein the anode comprises a high temperature non-magnetic material.

8. The segmented wall-less Hall thruster according to claim 7, wherein the high temperature non-magnetic material comprises stainless steel, molybdenum, and/or tungsten.

9. The segmented wall-less Hall thruster according to claim 1, wherein the additional electrode comprises a high temperature non-magnetic material.

10. The segmented wall-less Hall thruster according to claim 9, wherein the high temperature non-magnetic material comprises stainless steel, molybdenum, and/or tungsten.

11. The segmented wall-less Hall thruster according to claim 4, wherein the permanent magnet is separated from the second surface by a gap, the insulator comprising a second surface opposite the first surface, and the second surface faces the permanent magnet.

12. The segmented wall-less Hall thruster according to claim 4, wherein the insulator comprising a second surface opposite the first surface and the permanent magnet is in contact with the second surface.

13. The segmented wall-less Hall thruster according to claim 1, wherein the insulator is a ceramic.

14. The segmented wall-less Hall thruster according to claim 13, wherein the ceramic is a boron nitride ceramic.

15. The segmented wall-less Hall thruster according to claim 1, wherein the cathode comprises one of a thermionic hollow cathode or a thermionic filament.

16. The segmented wall-less Hall thruster according to claim 1, wherein the power supply is configured to apply voltage to the cathode, and at least one of the anode and the additional electrode.

17. The segmented wall-less Hall thruster according to claim 16, wherein the power supply is configured to apply a DC or modulated voltage to the additional electrode to change an acceleration region and/or ionization region of the segmented wall-less Hall thruster.

18. The segmented wall-less Hall thruster according to claim 16, wherein the power supply is coupled to at least one processor, the at least one processor configured to control an acceleration and suppress spoke instability of the segmented wall-less Hall thruster by controlling a frequency and/or an amplitude of a voltage provided by the power supply to at least one of the anode and the additional electrode and/or the cathode.

19. The segmented wall-less Hall thruster according to claim 1, wherein the anode is disposed in a location configured to produce a higher radial magnetic field than a magnetic field near the additional electrode.

20. The segmented wall-less Hall thruster according to claim 1, wherein the additional electrode is disposed in a location configured to produce a higher axial magnetic field than a magnetic field near the anode.

21. The segmented wall-less Hall thruster according to claim 1, further comprising a magnetic core and a single central permanent magnet disposed within the magnetic core.

* * * * *